United States Patent
Chong et al.

(10) Patent No.: US 11,991,049 B2
(45) Date of Patent: May 21, 2024

(54) COMMUNICATION METHOD, APPARATUS, AND SYSTEM

(71) Applicant: HUAWEI TECHNOLOGIES CO., LTD., Shenzhen (CN)

(72) Inventors: Weiwei Chong, Shenzhen (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/990,934

(22) Filed: Nov. 21, 2022

(65) Prior Publication Data
US 2023/0100296 A1    Mar. 30, 2023

Related U.S. Application Data

(63) Continuation of application No. PCT/CN2021/074345, filed on Jan. 29, 2021.

(30) Foreign Application Priority Data

May 22, 2020 (CN) .......................... 202010441748.0

(51) Int. Cl.
*H04L 41/14* (2022.01)
*H04L 43/0805* (2022.01)

(52) U.S. Cl.
CPC .......... *H04L 41/14* (2013.01); *H04L 43/0805* (2013.01)

(58) Field of Classification Search
None
See application file for complete search history.

(56) References Cited

U.S. PATENT DOCUMENTS 10,545,699 B2   1/2020  Baptist et al.
10,678,225 B2 * 6/2020  Kidd ................ G05B 19/41865
(Continued)

FOREIGN PATENT DOCUMENTS

CN     106603418 A    4/2017
CN     108184008 A    6/2018
(Continued)

OTHER PUBLICATIONS

Chinese Office Action issued in corresponding Chinese Application No. 202010441748.0, dated Apr. 27, 2023, pp. 1-6.
(Continued)

*Primary Examiner* — Ranodhi Serrao
(74) *Attorney, Agent, or Firm* — HAUPTMAN HAM, LLP

(57) ABSTRACT

A communication method includes receiving, by a second data analytics network element, a status analytics output of a target object from a first data analytics network element. The target object includes one or more of a network device, a sub-domain of a network, an all-domain of a network, or a terminal device. The communication method also includes obtaining, by the second data analytics network element based on the status analytics output of the target object, first input data corresponding to a target type of analytics. The status analytics output of the target object indicates that the target object is in an abnormal state, indicating that the first input data does not comprise data corresponding to the target object. The communication method further includes generating, by the second data analytics network element based on the first input data, a first analytics output corresponding to the target type of analytics.

20 Claims, 5 Drawing Sheets

(56) References Cited

U.S. PATENT DOCUMENTS

| | | | | |
|---|---|---|---|---|
| 11,304,070 | B2* | 4/2022 | Sanneck | H04W 24/10 |
| 2015/0382209 | A1* | 12/2015 | Sanneck | H04W 24/02 |
| | | | | 370/254 |
| 2017/0102693 | A1* | 4/2017 | Kidd | G05B 19/41875 |
| 2018/0293024 | A1 | 10/2018 | Baptist et al. | |
| 2020/0186449 | A1* | 6/2020 | Tofighbakhsh | H04L 43/04 |
| 2020/0202986 | A1* | 6/2020 | Celka | G16H 10/60 |
| 2021/0099493 | A1* | 4/2021 | Sun | H04L 63/20 |
| 2021/0105638 | A1* | 4/2021 | Al-Kanani | H04L 41/142 |
| 2021/0204198 | A1 | 7/2021 | Xin et al. | |
| 2022/0394525 | A1* | 12/2022 | Lee | H04L 67/562 |
| 2023/0071081 | A1* | 3/2023 | Hong | H04W 24/08 |

FOREIGN PATENT DOCUMENTS

| | | | |
|---|---|---|---|
| CN | 110650034 | A | 1/2020 |
| WO | 2020001336 | A1 | 1/2020 |
| WO | 2020063335 | A1 | 4/2020 |

OTHER PUBLICATIONS

3GPP TS 23.288 V16.3.0 (Mar. 2020), 3rd Generation Partnership Project; Technical Specification Group Services and System Aspects; Architecture enhancements for 5G System (5GS) to support network data analytics services(Release 16), 62 pages.

International Search Report issued in corresponding International Application No. PCT/CN2021/074345, dated Mar. 31, 2021, pp. 1-9.

"5G; 5G System; Network Data Analytics Services; Stage 3 (3GPP TS 29.520 version 15.5.0 Release 15)", V15.5.0 Oct. 14, 2019 (Oct. 14, 2019), pp. 1-41, XP014355889.

3GPP TS 23.288,V16.2.0"3rd Generation Partnership Project; Technical Specification Group Services and System Aspects; Architecture enhancements for 5G System (5GS) to support network data analytics services (Release 16)", Dec. 22, 2019, pp. 1-57, XP051840923.

Extended European Search Report issued in corresponding European Application No. 21807898.8, dated Sep. 21, 2023, pp. 1-17.

* cited by examiner

COMMUNICATION METHOD, APPARATUS, AND SYSTEM

CROSS-REFERENCE TO RELATED APPLICATIONS

This is a continuation of International Patent Application No. PCT/CN2021/074345, filed on Jan. 29, 2021, which claims priority to Chinese Patent Application No. 202010441748.0, filed on May 22, 2020. The disclosures of the aforementioned applications are hereby incorporated by reference in their entireties.

TECHNICAL FIELD

This application relates to the field of communication technologies, and in particular, to a communication method, apparatus, and system.

BACKGROUND

In a wireless communication network, some network elements may have a network data analysis function. For example, a network data analytics function (NWDAF) network element in a 3rd generation partnership project (3GPP) network may obtain data in the network, perform corresponding training and analysis work by using a method such as machine learning, and generate an analytics output. The analytics output may be used to assist in network policy formulation and execution.

However, if some network elements generate analytics outputs based on incorrect sample data, accuracy of the obtained analytics outputs may be low.

SUMMARY

Embodiments of this application provide a communication method, apparatus, and system, to improve accuracy of an analytics output generated by a data analytics network element.

According to a first aspect, an embodiment of this application provides a communication method: A second data analytics network element receives a status analytics output of a target object from a first data analytics network element, where the target object includes one or more of a network device, a sub-domain of a network, an all-domain of a network, or a terminal device. The second data analytics network element obtains, based on the status analytics output of the target object, first input data corresponding to a target type of analytics, where when the status analytics output of the target object indicates that the target object is in an abnormal state, the first input data does not include data corresponding to the target object. The second data analytics network element generates, based on the first input data, a first analytics output corresponding to the target type of analytics. In this implementation, the status analytics output of the target object that is received by the second data analytics network element may represent whether the target object is in an abnormal state. If the target object is in an abnormal state, an error may occur in the data corresponding to the target object. In this case, the first input data corresponding to the target type of analytics obtained by the second data analytics network element may not include the data corresponding to the target object. In this way, the first analytics output corresponding to the target type of analytics that is generated by the second data analytics network element based on the first input data may not be affected by the incorrect data corresponding to the target object, so that the correctness of the first analytics output can be improved.

When target objects include a plurality of types of objects, the first data analytics network element may separately detect whether each type of object is in an abnormal state.

In a possible implementation, the second data analytics network element sends the first analytics output and/or first indication information to a first network element. The first indication information indicates the first network element to disable a second analytics output or lower a confidence level corresponding to the second analytics output to a first confidence level. The second analytics output is an analytics output that is of the target type of analytics and that is generated by the second data analytics network element based on second input data and sent to the first network element. The second input data packet includes data corresponding to the target object. In this implementation, the second data analytics network element may send the generated first analytics output to the first network element, so that the first network element performs a corresponding processing operation based on the first analytics output with higher correctness (compared with the second analytics output generated based on the data corresponding to the target object). For example, the first network element may modify an operation previously performed based on the second analytics output. In addition, the second analytics output previously received by the first network element is generated based on the data corresponding to the target object in an abnormal state. Therefore, the second data analytics network element may also send the first indication information to the first network element, to indicate the first network element that the confidence level of the second analytics output previously received by the first network element is lowered, that is, a trustworthiness level of the second analytics output is lowered. In this way, the first network element may perform corresponding processing based on the second analytics output whose confidence level is lowered. For example, when the confidence level of the second analytics output is lowered from 90% to 30%, the second analytics output may be disabled. Particularly, if a second analytics output is generated based on data corresponding to a large quantity of objects, and a quantity of target objects in an abnormal state is small, a decrease of the confidence level of the second analytics output is low, for example, from 90% to 89%. In this case, the first network element continues to use the second analytics output to perform corresponding processing.

In a possible implementation, that the second data analytics network element sends the first analytics output to the first network element includes: When the second data analytics network element determines that the first analytics output is different from the second analytics output, the second data analytics network element sends the first analytics output to the first network element. In this implementation, if the first analytics output is different from the second analytics output, it indicates that the data corresponding to the target object may have a large impact on the generated analytics output. For example, the analytics output is specifically an analytics output that represents service quality of the terminal device. The second analytics output previously received by the first network element may represent high service quality of the terminal device, while the first analytics output represents low service quality of the terminal device. In this case, the first network element may improve, based on the received first analytics output, a network resource allocated to the terminal device, to improve service quality of the terminal device.

In another possible implementation, alternatively, when the second data analytics network element determines that the input data originally used to generate the analytics output includes the data corresponding to the target object, and the target object is in an abnormal state, the second data analytics network element may determine to send the generated first analytics output to the first network element.

In a possible implementation, the method further includes: The second data analytics network element obtains first time information and/or first area information corresponding to the status analytics output of the target object. That the first input data does not include data corresponding to the target object includes: The first input data does not include data that is of the target object and that corresponds to the first time information and/or the first area information. In this implementation, when obtaining input data required for generating the status analytics output of the target object, the first data analytics network element may obtain input data corresponding to the first time information and/or the first area information, and generate, based on the input data, the status analytics output of the target object corresponding to the first time information and/or the first area information. The first time information may include any one or more of the following information: start time, end time, or duration. The first area information may be represented as a network area and/or a geographical area.

In a possible implementation, the method further includes: The second data analytics network element sends second time information and/or second area information corresponding to the first indication information to the first network element. In this implementation, the first indication information sent by the second data analytics network element may correspond to a specific time period or a specific area, so that a confidence level of the first analytics output in the time period or the area is lowered, but a confidence level in another time period or another area does not need to be lowered. In this way, after receiving the second time information and/or the second area information, the first network element may determine whether an incorrect processing operation has been performed in the past based on the second analytics output and the confidence level corresponding to the second analytics output. Alternatively, the first network element may determine a time period and/or an area in which the second analytics output is disabled. In this way, correctness of the processing operation performed by the first network element is improved. The second time information may be determined by the second data analytics network element based on the first time information. For example, a time period indicated by the second time information may be a subset of a time period indicated by the first time information. Alternatively, a time period indicated by the second time information may be a time period that is predicted by the second data analytics network element. The second area information may be determined by the second data analytics network element based on the first area information. For example, the area indicated by the second area information may be a subset of an area indicated by the first area information.

In a possible implementation, the method further includes: The second data analytics network element sends third time information and/or third area information applicable to the first analytics output to the first network element. In this implementation, the third time information sent by the second data analytics network element to the first network element may indicate a time period in which the first network element is suitable to perform corresponding processing by using the first analytics output, that is, a time period in which the first analytics output is applicable; and the third area information sent by the second data analytics network element to the first network element may indicate an area in which the first network element is suitable to perform corresponding processing by using the first analytics output, namely, a validation area of the first analytics output. The third time information may be determined by the second data analytics network element based on the first time information. For example, a time period indicated by the third time information may be a subset of a time period indicated by the first time information. The third area information may be determined by the second data analytics network element based on the first area information. For example, the area indicated by the third area information may be a subset of an area indicated by the first area information.

In a possible implementation, the method further includes: The second data analytics network element sends a first exception reason to the first network element, where the first exception reason indicates a reason why the first analytics output and/or the first indication information are/is sent. In this implementation, the first network element may determine, based on the first exception reason, why the second data analytics network element sends the first analytics output and/or the first indication information to the first network element. For example, the first network element may determine, based on the first exception reason, a reason why the confidence level corresponding to the second analytics output is lowered is that the second input data includes the data of the target object in an abnormal state, where the second analytics output is previously generated based on the second input data. Alternatively, the first network element may determine that the second analytics output previously sent by the second data analytics network element is inaccurate, or the like.

In a possible implementation, that the second data analytics network element obtains, based on the status analytics output of the target object, first input data corresponding to a target type of analytics includes: The second data analytics network element deletes the data corresponding to the target object in third input data that is obtained and that corresponds to the target type of analytics, to obtain the first input data; or the second data analytics network element unsubscribes the data corresponding to the target object from the second network element, and receives the first input data from a third network element. In this implementation, a manner in which the second data analytics network element obtains the first input data that does not include the data corresponding to the target object may be removing data corresponding to the target object in an abnormal state from the obtained third data corresponding to all objects. In this way, remaining data after removal may be used as input data used to generate the first analytics output. Alternatively, the second data analytics network element may unsubscribe from the data corresponding to the target object from the corresponding network element in the network. In this way, the corresponding network element in the network may no longer provide the data corresponding to the target object to the second data analytics network element, so that the input data that is required for generating the first analytics output and that is obtained by the second data analytics network element from the network does not include the data corresponding to the target object.

In a possible implementation, that the second data analytics network element obtains, based on the status analytics output of the target object, first input data corresponding to a target type of analytics includes: The second data analytics network element refuses to receive the data corresponding to the target object from the first network element. In this implementation, the first network element may still send the data corresponding to the target object to the second data analytics network element. However, after determining that the target object is in an abnormal state, the second data analytics network element may refuse to receive the data, so that the input data that is obtained by the second data analytics network element and that is used to generate the first analytics output may not include the data corresponding to the target object.

In a possible implementation, the status analytics output of the target object includes a status prediction analytics output of the target object. In this implementation, the status analytics output of the target object may alternatively be obtained through predicting a status of the target object. For example, based on temperature data generated by the target object in a historical time period, it may be predicted through corresponding analysis that, because the device temperature of the target object always keeps increasing and does not slow down, the target object may be faulty in a future time period due to an excessively high temperature rise.

Certainly, in another possible implementation, the status analytics output of the target object may alternatively be an output obtained through collecting statistics of a status of the target object. For example, if it may be determined, based on temperature data generated by the target object in a historical time period, that a temperature of the target object in the time period exceeds an upper temperature limit in a normal case, it may be determined that the target object is in an abnormal state due to an excessively high temperature.

In a possible implementation, the status analytics output of the target object includes an analytics output of a historical status of the target object and/or an analytics output of a future status of the target object. In this implementation, the status analytics output of the target object may be an output obtained through analyzing whether the target object is abnormal in the historical status. Alternatively, the status analytics output of the target object may be an output obtained through predicting whether the target object is abnormal in the future status.

In a possible implementation, the method further includes: The second data analytics network element obtains a second confidence level corresponding to the status analytics output of the target object from the first data analytics network element. That the second data analytics network element obtains, based on the status analytics output of the target object, first input data corresponding to a target type of analytics includes: When the second data analytics network element determines that the second confidence level is greater than a first threshold, and determines, based on the status analytics output of the target object, that the target object is in an abnormal state, the second data analytics network element obtains, based on the status analytics output of the target object, the first input data corresponding to the target type of analytics. In this implementation, the status analytics output of the target object may also have a corresponding confidence level (that is, the foregoing second confidence level). In this case, the second data analytics network element may determine, based on the second confidence level corresponding to the status analytics output of the target object, whether to adjust the input data for generating the first analytics output. For example, the status analytics output of the target object represents that the target object is in an abnormal state. However, the confidence level of the status analytics output of the target object is 30%, indicating that a possibility that the target object is in an abnormal state is only 30%, while a possibility that the target object is in a normal state is 70%, that is, a possibility that the target object is in a normal state is higher. In this case, the second data analytics network element may not need to adjust the input data for generating the first analytics output, that is, the input data for generating the first analytics output may include the data corresponding to the target object.

In a possible implementation, the method further includes: The second data analytics network element sends a third confidence level corresponding to the first analytics output to the first network element, where the third confidence level is determined by the second data analytics network element based on the first input data and the second confidence level. In this implementation, the first analytics output fed back by the second data analytics network element to the first network element may further have a corresponding confidence level. In this way, when the confidence level of the first analytics output is high, indicating that the trustworthiness level of the first analytics output is high, the first network element performs a corresponding processing operation based on the first analytics output. When the confidence level of the first analytics output is low, indicating that the trustworthiness level of the first analytics output is low, the first network element may disable the first analytics output.

In a possible implementation, that a second data analytics network element receives a status analytics output of a target object from a first data analytics network element includes: the second data analytics network element obtains the status analytics output of the target object from a fourth network element, where the status analytics output of the target object is sent by the first data analytics network element to the fourth network element. In this implementation, after generating the status analytics output of the target object, the first data analytics network element may send the status analytics output to the fourth network element (for example, a UDM or a UDR network element) for storage. When the second data analytics network element needs to obtain the status analytics output of the target object, the second data analytics network element may directly obtain the status analytics output from the fourth network element, so that the fourth network element may provide a unified interface for each data analytics network element in the network to obtain the status analytics output of the object required by each data analytics network element.

In a possible implementation, the method further includes: The second data analytics network element sends second indication information to the first data analytics network element, where the second indication information indicates the first data analytics network element to feed back a status analytics output of the target object when the target object is in an abnormal state. In this implementation, the first data analytics network element may feed back the status analytics output of the target object to the second data analytics network element based on the second indication information only when determining that the target object is in an abnormal state, and does not feed back the status analytics output when determining that the target object is in a normal state. Correspondingly, the second data analytics network element may determine that the target object is in an abnormal state when receiving the status analytics output of the target object, and determine that the target object is in a normal state when not receiving the status analytics output of the target object. In this way, a quantity of times of data communication and a data volume between the first data analytics network element and the second data analytics network element can be reduced, and network resources can be saved.

In a possible implementation, the method further includes: The second data analytics network element sends a query request to a fifth network element, where the query request is used to query for the first data analytics network element that generates the status analytics output of the target object. The second data analytics network element receives identification information that is of the first data analytics network element and that is sent by the fifth network element in response to the query request. The second data analytics network element sends a first request message to the first data analytics network element based on the identification information of the first data analytics network element, where the first request message is used to request a status analytics output of the target object from the first data analytics network element. In this implementation, because different data analytics network elements in a network may have different functions, or are responsible for data analyzing and processing work in different network areas, the second data analytics network element may further query for a specific data analytics network element that provides a service of generating the status analytics output of the target object. In an example, the query request may include one or more information such as a slice identifier, a service area identifier, an exception type identifier, or an exception subtype identifier.

In a possible implementation, the status analytics output of the target object includes status indication information, where the status indication information indicates that the target object is in any one of the following statuses: a normal state, an abnormal state, or an unknown state. When the status indication information indicates an unknown state, it indicates that whether the target object is in an abnormal state is unknown.

In a possible implementation, the status analytics output of the target object includes any one or more of the following information: an exception type, an exception subtype, a second exception reason, an exception level, or an exception trend. In this implementation, in addition to indicating whether the target object is in an abnormal state, the status analytics output of the target object may further include more other information. For example, when the status analytics output includes the exception trend, the first network element may determine, based on the exception trend, a time period to which the first analytics output is applicable.

In a possible implementation, a sub-domain of a network may include one or more of an access network domain, a core network domain, or a transport network domain.

In a possible implementation, the target object includes a target object of a target network slice. In this implementation, the target object may be specifically an object in a network slice. When the second data analytics network element requests from the first data analytics network element, a status analytics output corresponding to the target object, the second data analytics network element may send related information such as an identifier of the target network slice to the first data analytics network element, so that the first data analytics network element determines the target network slice based on the related information of the target network slice, to use the object in the target network slice as the target object, and further feed back the status analytics output corresponding to the target object to the second data analytics network element.

In a possible implementation, the network slice includes a slice instance or a slice sub-instance.

According to a second aspect, an embodiment of this application further provides a communication method. The method includes: A first data analytics network element obtains a status analytics output of a target object, where the target object includes one or more of a network device, a sub-domain of a network, an all-domain of a network, or a terminal device. The first data analytics network element sends the status analytics output of the target object to the second data analytics network element. In this implementation, the first data analytics network element may obtain the status analytics output of the target object, and send the status analytics output to the second data analytics network element, so that the second data analytics network element determines, based on the status analytics output of the target object, whether to adjust input data for generating an analytics output corresponding to a target analytics type, to prevent the analytics output generated by the second data analytics network element based on the input data that does not include data corresponding to the target object from being affected by the incorrect data corresponding to the target object. In this way, correctness of the first analytics output can be improved.

In a possible implementation, the method further includes: The first data analytics network element sends, to the second data analytics network element, first time information and/or first area information corresponding to the status analytics output of the target object. The first time information may include any one or more of the following information: start time, end time, or duration. The first area information may be represented as a network area and/or a geographical area.

In a possible implementation, the status analytics output of the target object includes an analytics output of a historical status of the target object or an analytics output of a future status of the target object. In this implementation, the status analytics output of the target object may be an output obtained through analyzing whether the target object is abnormal in the historical status. Alternatively, the status analytics output of the target object may be an output obtained through predicting whether the target object is abnormal in the future status.

In a possible implementation, the method further includes: The first data analytics network element sends, to the second data analytics network element, the second confidence level corresponding to the status analytics output of the target object. In this implementation, the status analytics output of the target object may also have a corresponding confidence level (that is, the foregoing second confidence level). After the first data analytics network element sends the second confidence level to the second data analytics network element, the second data analytics network element may determine, based on the second confidence level corresponding to the status analytics output of the target object, whether to adjust the input data for generating the first analytics output.

In a possible implementation, the method further includes: The first data analytics network element receives second indication information from the second data analytics network element. That the first data analytics network element sends the status analytics output of the target object to the second data analytics network element includes: When the first data analytics network element determines, based on the second indication information, that the target object is in an abnormal state, the first data analytics network element sends the status analytics output of the target object to the data analytics network element. In this implementation, the first data analytics network element sends, based on the second indication information, the status analytics output of the target object to the second data analytics network element only when determining that the target object is in an abnormal state, and does not feed back the status analytics output of the target object to the second data analytics network element when determining that the target object is in a normal state. In this way, a quantity of times of data communication and a data volume between the first data analytics network element and the second data analytics network element can be reduced, and network resources can be saved.

In a possible implementation, that a first data analytics network element obtains a status analytics output of a target object includes: The first data analytics network element receives a first request message from the second data analytics network element, where the first request message is used to request the status analytics output of the target object from the first data analytics network element. The first data analytics network element responds to the first request message, and generates the status analytics output of the target object.

In a possible implementation, the status analytics output of the target object includes status indication information, where the status indication information indicates that the target object is in any one of the following statuses: a normal state, an abnormal state, or an unknown state.

In a possible implementation, the status analytics output of the target object includes any one or more of the following information: an exception type, an exception subtype, a second exception reason, an exception level, or an exception trend. In this implementation, in addition to indicating whether the target object is in an abnormal state, the status analytics output of the target object may further include more other information. For example, when the status analytics output includes the exception trend, the first network element may determine, based on the exception trend, a time period to which the first analytics output is applicable.

In a possible implementation, the target object includes a target object of a target network slice. In this implementation, the target object may be specifically an object in a network slice. When the second data analytics network element requests from the first data analytics network element, a status analytics output corresponding to the target object, the second data analytics network element may send related information such as an identifier of the target network slice to the first data analytics network element, so that the first data analytics network element determines the target network slice based on the related information of the target network slice, to use the object in the target network slice as the target object, and further feed back the status analytics output corresponding to the target object to the second data analytics network element.

In a possible implementation, the network slice includes a slice instance or a slice sub-instance.

In a possible implementation, a sub-domain of a network may include one or more of an access network domain, a core network domain, or a transport network domain.

According to a third aspect, an embodiment of this application further provides a communication apparatus, including: a receiving unit, configured to receive a status analytics output of a target object from a first data analytics network element, where the target object includes one or more of a network device, a sub-domain of a network, an all-domain of a network, or a terminal device; and a processing unit, configured to: obtain, based on the status analytics output of the target object, first input data corresponding to a target type of analytics, where when the status analytics output of the target object indicates that the target object is in an abnormal state, the first input data does not include data corresponding to the target object; and generate, based on the first input data, a first analytics output corresponding to the target type of analytics.

In a possible implementation, the apparatus further includes a sending unit, configured to send the first analytics output and/or first indication information to a first network element. The first indication information indicates the first network element to disable a second analytics output or lower a confidence level corresponding to the second analytics output to a first confidence level. The second analytics output is an analytics output that is of the target type of analytics and that is generated by the second data analytics network element based on second input data and sent to the first network element. The second input data includes data corresponding to the target object.

In a possible implementation, the sending unit is specifically configured to: when the second data analytics network element determines that the first analytics output is different from the second analytics output, send, by the second data analytics network element, the first analytics output to the first network element.

In a possible implementation, the receiving unit is further configured to receive first time information and/or first area information corresponding to the status analytics output of the target object.

That the first input data does not include data corresponding to the target object includes: The first input data does not include data that is of the target object and that corresponds to the first time information and/or the first area information.

In a possible implementation, the sending unit is further configured to send second time information and/or second area information corresponding to the first indication information to the first network element.

In a possible implementation, the sending unit is further configured to send third time information and/or third area information applicable to the first analytics output to the first network element.

In a possible implementation, the sending unit is further configured to send a first exception reason to the first network element, where the first exception reason indicates a reason why the first analytics output and/or the first indication information are/is sent.

In a possible implementation, the processing unit is specifically configured to: delete the data corresponding to the target object in third input data that is obtained and that corresponds to the target type of analytics, to obtain the first input data; or unsubscribe the data corresponding to the target object from the second network element, and receive the first input data from a third network element.

In a possible implementation, the status analytics output of the target object includes a status prediction analytics output of the target object.

In a possible implementation, the receiving unit is further configured to receive a second confidence level corresponding to the status analytics output of the target object from the first data analytics network element.

The processing unit is specifically configured to: when the second data analytics network element determines that the second confidence level is greater than a first threshold, and determines, based on the status analytics output of the target object, that the target object is in the abnormal state, obtain, by the second data analytics network element, based on the status analytics output of the target object, the first input data corresponding to the target type of analytics.

In a possible implementation, the sending unit is further configured to send a third confidence level corresponding to the first analytics output to the first network element, where the third confidence level is determined by the second data analytics network element based on the first input data and the second confidence level.

In a possible implementation, the receiving unit is specifically configured to obtain the status analytics output of the target object from a fourth network element, where the status analytics output of the target object is sent by the first data analytics network element to the fourth network element.

In a possible implementation, the status analytics output of the target object includes status indication information, where the status indication information indicates that the target object is in any one of the following statuses: a normal state, an abnormal state, or an unknown state.

In a possible implementation, the status analytics output of the target object includes any one or more of the following information: an exception type, an exception subtype, a second exception reason, an exception level, or an exception trend.

The communication apparatus described in the third aspect corresponds to the communication method described in the first aspect. Therefore, for various possible implementations of the third aspect and beneficial effects thereof, refer to related descriptions of corresponding implementations and beneficial effects in the first aspect. Details are not described herein again.

According to a fourth aspect, an embodiment of this application further provides a communication apparatus. The apparatus includes: a processing unit, configured to receive a status analytics output of a target object from a first data analytics network element, where the target object includes one or more of a network device, a sub-domain of a network, an all-domain of a network, or a terminal device; and a sending unit, configured to send the status analytics output of the target object.

In a possible implementation, the sending unit is further configured to send, to a second data analytics network element, first time information and/or first area information corresponding to the status analytics output of the target object.

In a possible implementation, the status analytics output of the target object includes an analytics output of a historical status of the target object or an analytics output of a future status of the target object.

In a possible implementation, the sending unit is further configured to send a second confidence level corresponding to the status analytics output of the target object to the second data analytics network element.

In a possible implementation, the apparatus further includes a receiving unit, configured to receive second indication information from the second data analytics network element. The sending unit is specifically configured to: when it is determined, based on the second indication information, that the target object is in an abnormal state, send the status analytics output of the target object to the data analytics network element.

In a possible implementation, the processing unit is specifically configured to respond to a first request message from the second data analytics network element received by using the receiving unit, and generate the status analytics output of the target object, where the first request message is configured to request the status analytics output of the target object from the first data analytics network element.

In a possible implementation, the status analytics output of the target object includes status indication information, where the status indication information indicates that the target object is in any one of the following statuses: a normal state, an abnormal state, or an unknown state.

In a possible implementation, the status analytics output of the target object includes any one or more of the following information: an exception type, an exception subtype, a second exception reason, an exception level, or an exception trend.

In a possible implementation, the target object includes a target object of a target network slice.

In a possible implementation, the network slice includes a slice instance or a slice sub-instance.

In a possible implementation, a sub-domain of a network may include one or more of an access network domain, a core network domain, or a transport network domain.

The communication apparatus described in the fourth aspect corresponds to the communication method described in the second aspect. Therefore, for various possible implementations of the fourth aspect and beneficial effects thereof, refer to related descriptions of corresponding implementations and beneficial effects in the second aspect. Details are not described herein again.

According to a fifth aspect, an embodiment of this application further provides a communication apparatus. The communication apparatus includes a processor and a memory, where the memory is configured to store a computer program or instructions, and the processor is configured to execute the computer program or the instructions, so that the method according to any implementation of the first aspect and the method according to any implementation of the second aspect are performed.

The communication apparatus described in the fifth aspect corresponds to the communication method described in the first aspect and the second aspect. Therefore, for various possible implementations of the fifth aspect and beneficial effects thereof, refer to related descriptions of corresponding implementations and beneficial effects in the first aspect and the second aspect. Details are not described herein again.

According to a sixth aspect, an embodiment of this application further provides a computer-readable storage medium, including instructions or a computer program. When the instructions or the computer program is executed on a computer, the computer is enabled to perform the method according to any implementation of the first aspect and the method according to any implementation of the second aspect.

The computer-readable storage medium described in the sixth aspect corresponds to the communication method described in the first aspect or the second aspect. Therefore, for various possible implementations of the sixth aspect and beneficial effects thereof, refer to related descriptions of corresponding implementations and beneficial effects in the first aspect and the second aspect. Details are not described herein again.

According to a seventh aspect, an embodiment of this application further provides a communication system. The system may include the second data analytics network element according to any implementation of the first aspect and the first data analytics network element according to any implementation of the second aspect.

The communication system described in the seventh aspect corresponds to the communication method described in the first aspect or the second aspect. Therefore, for various possible implementations of the seventh aspect and beneficial effects thereof, refer to related descriptions of corresponding implementations and beneficial effects in the first aspect or the second aspect. Details are not described herein again.

According to an eighth aspect, an embodiment of this application provides a chip. The chip includes a processor and a communication interface, where the communication interface is coupled to the processor, and the processor is configured to run a computer program or instructions, to implement the communication methods described in various possible implementations of the first aspect and the second aspect. The communication interface is configured to communicate with a module outside the chip.

BRIEF DESCRIPTION OF DRAWINGS

To describe technical solutions of embodiments of this application more clearly, the following briefly describes the accompanying drawings for describing embodiments. It is clear that the accompanying drawings in the following descriptions show merely some embodiments of this application, and a person of ordinary skill in the art may derive other drawings from these accompanying drawings.

DESCRIPTION OF EMBODIMENTS

Figure 1:
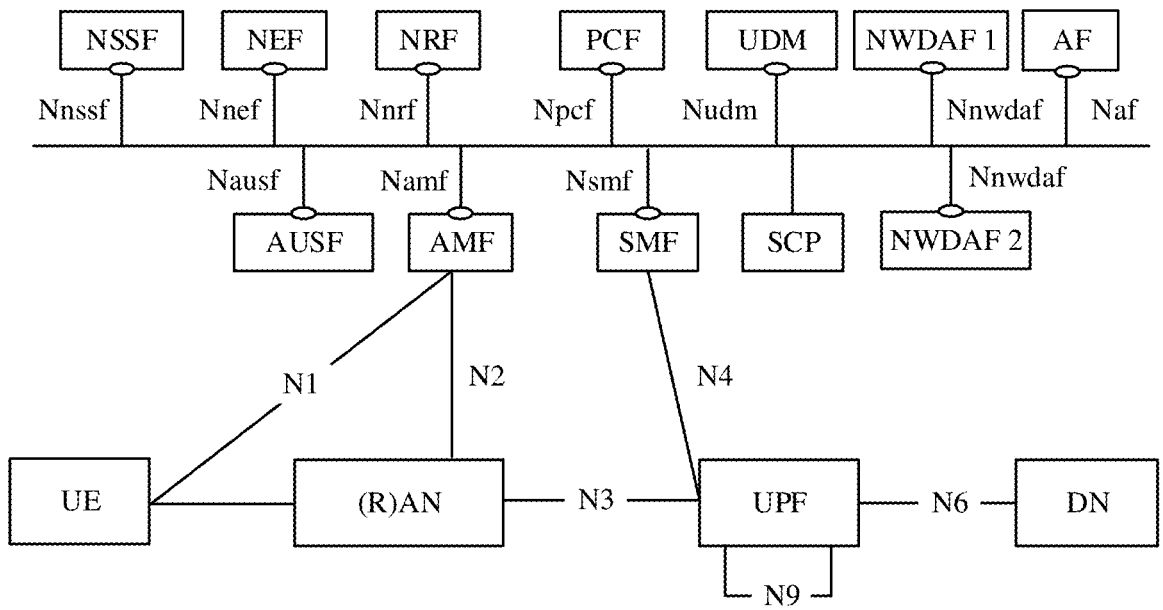
FIG. 1 is a schematic diagram of an architecture of an example communication system according to an embodiment of this application.

Embodiments of this application may be applied to an example communication system shown in FIG. 1. The communication system may be a communication system that supports a fourth generation (4G) access technology, for example, a long term evolution (LTE) access technology. Alternatively, the communication system may be a communication system that supports a fifth generation (5G) access technology, for example, a new radio (NR) access technology. Alternatively, the communication system may be a communication system that supports a plurality of wireless technologies, for example, a communication system that supports an LTE technology and an NR technology. In addition, the communication system may alternatively be applicable to a future-oriented communication technology.

In the communication system, a terminal accesses a core network by using an access network (AN) network element or a radio access network (RAN). The terminal includes but is not limited to: user equipment (UE), a subscriber unit, a subscriber station, a mobile station, a remote station, a remote terminal device, a mobile terminal device, a user terminal device, a terminal device, a wireless communication device, a user agent, a user apparatus, a cellular phone, a cordless phone, a session initiation protocol (SIP) phone, a wireless local loop (WLL) station, a personal digital assistant (PDA), a handheld device with a wireless communication function, a computing device, a processing device connected to a wireless modem, a vehicle-mounted device, a wearable device, a terminal device in the internet of things, a household appliance, a virtual reality device, a terminal device in a future 5G network, a terminal device in a future evolved public land mobile network (PLMN), or the like. In embodiments of this application, an example in which the terminal is UE is used for description.

The AN (or the RAN) may be a network element that communicates with the terminal. The AN (or RAN) may provide communication coverage for a specific geographic area, and may communicate with user equipment located within the coverage area (cell). The AN (or the RAN) may communicate with any quantity of UE. There may be a plurality of air interface connections between the AN (or the RAN) and the UE. For example, there are two air interface connections between the AN (or the RAN) and the UE, which are respectively used to transmit a data flow A and a data flow B. The AN (or the RAN) may support communication protocols of different standards, or may support different communication modes. For example, the AN (or the RAN) may be an evolved NodeB (eNodeB), a wireless fidelity access point (Wi-Fi AP), a worldwide interoperability for microwave access (WiMAX BS), or a radio controller in a cloud radio access network (C-RAN). Alternatively, the access network element may be an access network element in a future 5G network or an access network element in a future evolved PLMN.

The core network may include: a user plane function (UPF) network element, a network slice selection function (NSSF) network element, a network capability exposure function (NEF) network element, a network storage function (NRF) network element, a policy control function (PCF) network element, a unified data management function (UDM) network element, a network data analytics function (NWDAF) network element, an authentication server function (AUSF) network element, an access management function (AMF) network element, a session management function (SMF) network element, or a service control point (SCP). User plane data may be transmitted between the UE and a data network (DN) via the AN (or the RAN) and the user plane function network element.

The AMF network element may be configured to provide a function such as mobility management, or access authorization and authentication for the UE.

Application function (AF) network elements may be classified into an operator AF network element and a third-party AF network element, where a difference lies in whether the application function network element is deployed by an operator. Third-party AF network elements include various application-related servers that are not deployed by an operator, for example, an AF related to a railway system, an AF related to a medical system, an AF related to an OTT (over the top) service, and an AF related to a government community (for example, a community service app).

The NEF network element may be configured to expose data and a service of a communication operator network to an external AF network element, or reversely, expose data or a service provided by the AF network element to the operator.

The NWDAF network element may have one or more of the following functions: a data collection function, a training function, an analysis function, or an inference function. For example, the NWDAF network element is configured to collect related data from a network element, a third-party service server, a terminal device, or a network management system, and perform analysis training based on the related data, to provide a corresponding data analytics output for the network element, the third-party service server, the terminal device, or the network management system. The analytics output may assist the network in selecting a service quality parameter of a service, routing traffic, selecting a background traffic transfer policy, or the like. The NWDAF network element may be separately disposed as an independent network element in a network, or the NWDAF network element and another network element may be co-disposed. For example, an NWDAF network element function is disposed on an SMF network element or an AMF network element. A network may include one or more NWDAF network elements. Different NWDAF network elements may have different data type analysis functions, or certainly, may have a same data type analysis function.

Another NF (network function) refers to another node or physical device in a network, and may have one or more of the following functions: providing corresponding function support for UE to access a network, perform a session, perform authentication and authorization, control a policy, or the like. Corresponding network data may be generated. For example, the AMF, the SMF, and the UDM are all instances of the NF.

The terminal and the network element or different network elements may communicate with each other via a corresponding service interface or a point-to-point interface. For example, the UE may communicate with the AMF network element by using an N1 interface, and the AN may communicate with the UPF network element by using an N3 interface (similar to point-to-point interfaces such as N2, N4, N6, and N9 interfaces). For another example, the AMF network element may communicate with another network element in the network by using a service interface Namf interface, and the AF network element may communicate with another network element by using a service interface Naf interface. Other details are not described herein.

In the communication system shown in FIG. 1, functions of the component network elements are merely examples. When the component network elements are applied to embodiments of this application, not all functions are necessary. It should be noted that the communication system shown in FIG. 1 is merely an example of the communication system provided in embodiments of this application. Embodiments of this application may be applied to any applicable communication system, and are not limited to the communication system shown in FIG. 1.

The communication system shown in FIG. 1 may include at least two NWDAF network elements, for example, an NWDAF 1 network element and an NWDAF 2 network element in FIG. 1. Certainly, the communication system may alternatively include more than three (including three) NWDAF network elements, or the like. An analytics output generated by the NWDAF 1 network element may be sent to the NWDAF 2 network element. The NWDAF 2 network element may adjust input data of the NWDAF 2 based on the analytics output sent by the NWDAF 1 network element, and generate a corresponding analytics output based on adjusted input data, to improve accuracy of the analytics output generated by the NWDAF 2 network element. When the communication system includes a third NWDAF network element, a fourth NWDAF network element, or the like, the NWDAF 1 network element may alternatively send the generated analytics output to both the third NWDAF network element and the fourth NWDAF network element, so that another NWDAF network element may correspondingly adjust input data of the another NWDAF network element based on the received analytics output.

To make the objectives, features, and advantages of this application more apparent and understandable, the following describes various non-limiting implementations in embodiments of this application with reference to the accompanying drawings by using examples. Clearly, the described embodiments are some but not all of embodiments of this application. All other embodiments obtained by a person of ordinary skill in the art based on embodiments of this application without creative efforts shall fall within the protection scope of this application.

Figure 2:
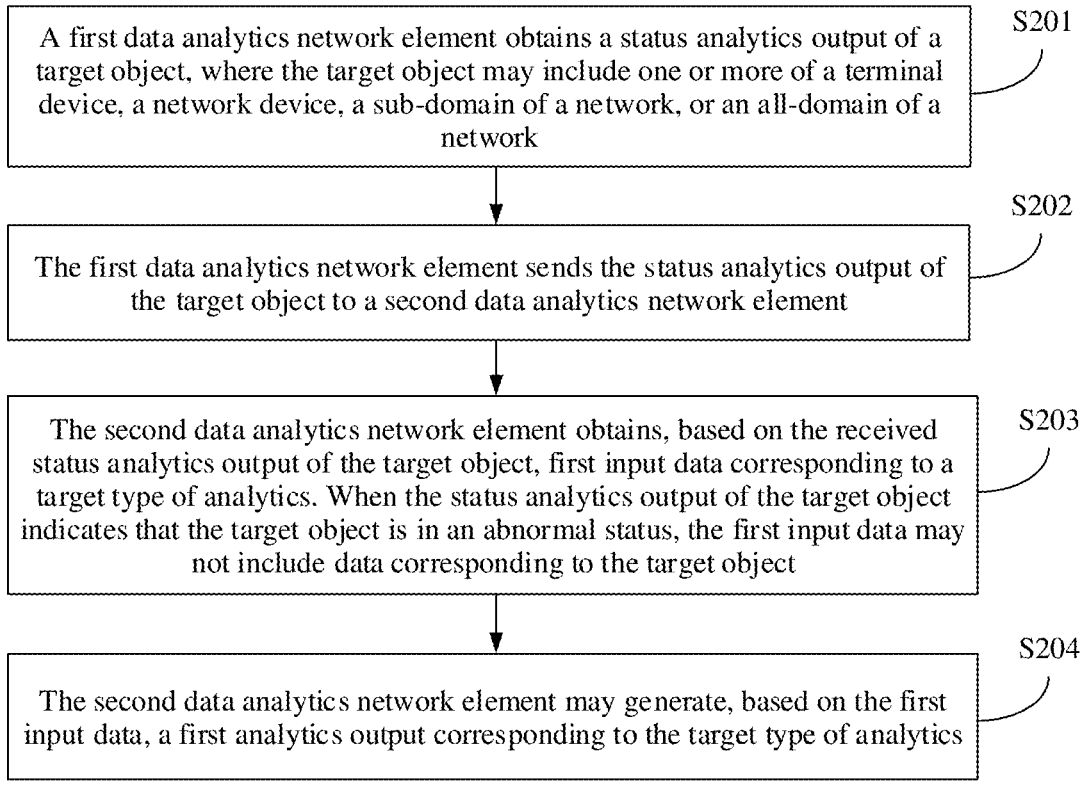
FIG. 2 is a schematic flowchart of a communication method according to an embodiment of this application.

FIG. 2 is a schematic flowchart of a communication method according to an embodiment of this application. The method may be applied to a communication system shown in FIG. 1, or may be applied to another applicable communication system. When the data analytics network element is applied to the communication system shown in FIG. 1, the first data analytics network element in this embodiment may be an NWDAF 1 network element in the communication system shown in FIG. 1, and the second data analytics network element may be an NWDAF 2 network element in the communication system. Certainly, the data analytics network element may alternatively be another network element having a data analytics capability in the network, for example, a management data analytics function (MDAF) network element. The first network element may be another network element other than the NWDAF network element in the communication system, for example, an AF network element, an AMF network element, a UDM network element, a RAN network element, or UE. The first network element and the data analytics network element may be co-disposed or independently deployed in a network. The method may specifically include the following steps.

S201: The first data analytics network element obtains a status analytics output of a target object, where the target object may include one or more of a terminal device, a network device, a sub-domain of a network, or an all-domain of a network, and there may be one or more target objects.

S202: The first data analytics network element sends the status analytics output of the target object to the second data analytics network element.

In this embodiment, the first data analytics network element may detect a status of the target object in the communication system, and generate the corresponding status analytics output. The status analytics output of the target object may represent whether the target object is in an abnormal state. The target object may be specifically any one or more of the terminal device, the network device, the sub-domain of a network, or an all-domain of a network in a communication system. Particularly, when target objects include a plurality of types of objects, the first data analytics network element may separately detect whether each type of object is in an abnormal state. The sub-domain of a network may include one or more of an access network domain, a core network domain, or a transport network domain.

In an example, the first data analytics network element may be configured to actively detect the status of the target object in the network, to determine whether the target object is in an abnormal state.

In another example, another network element in the communication system may request the first data analytics network element to detect the status of the target object. For example, the second data analytics network element in the communication system may send a first request message to the first data analytics network element, to request the first data analytics network element to feed back the status analytics output of the target object, where the first request message may carry an identifier of the target object. Certainly, in addition to the second data analytics network element, a network element that requests the first data analytics network element to detect the target object may be another network element such as an AMF network element or a UDM network element. This is not limited in this embodiment.

Optionally, the first request message received by the first data analytics network element may include first time information and/or first area information. When obtaining input data required for generating the status analytics output of the target object, the first data analytics network element may obtain input data corresponding to the first time information and/or the first area information, and generate, based on the input data, a status analytics output of the target object corresponding to the first time information and/or the first area information. For example, if the first time information indicates a time period from 8:00 to 12:00 on Apr. 28, 2020, the first data analytics network element may obtain only related data of the target object in the time period from another network element, and generate, based on the data in the time period, a corresponding status analytics output of the target object.

The first time information (similar to a second time information and a third time information below) may include any one or more of the following information: start time, end time, or duration. The first area information (similar to a second area information and a third area information below) may be represented as a network area (for example, a network area such as a cell or a tracking area TA served by one or more network elements) and/or a geographical area (for example, an administrative area or a physical area represented by a coordinate value).

In addition, the first request message received by the first data analytics network element may alternatively include any one or more of identification information of a network slice, a service type, a data network name (DNN), an exception type, or an exception subtype. When the first request message includes the service type, it represents that the first data analytics network element is requested to perform status analysis on a target object corresponding to the service type. When the first request message includes the identification information of the network slice, it represents that the first data analytics network element is requested to perform status analysis on a target object in a network slice corresponding to the identifier of the network slice. The network slice may include a slice instance, a slice sub-instance, or the like. When the first request message includes DNN information, it represents that the first data analytics network element is requested to perform status analysis on a target object in a specific DNN in a network. When the first request message includes the exception type and/or the exception subtype, it represents that the first data analytics network element is requested to feed back an abnormal state indicated when a target object is in the exception type and/or the exception subtype. The exception type may be, for example, a network attack, network overload, a network device fault, an insufficient network resource, weak network signal coverage, or an abnormal behavior of a terminal device. In addition, the exception type may be subdivided into a plurality of exception subtypes. For example, the exception type of the network attack may be subdivided into exception subtypes such as a DDoS (distributed denial of service) attack, network tampering, and identity masquerade. For another example, the exception type of the abnormal behavior of the terminal device may be further subdivided into ping-ponging across cells accessed by the terminal, a DDoS attack that is suspected to be initiated by the terminal, abnormal wake-up of the terminal device, abnormal battery power consumption, abnormal traffic, abnormal air interface link disconnection, and the like.

The first data analytics network element may respond to the received first request message, and obtain, based on the identifier of the target object that is parsed out from the first request message, related data of the target object from a corresponding network element (such as a RAN, an AMF, an SMF, a UPF, an OAM, an NRF or a UDM network element) in the network. For example, the first data analytics network element may send a data report request including the identifier of the target object to the corresponding network element in the network, to request the network element to report related information of the target object to the first data analytics network element. In this way, the first data analytics network element may perform analytics processing based on the received data, generate a status analytics output for the target object, and send the generated status analytics output to the second data analytics network element. For example, after the first data analytics network element receives the first request message, the data obtained from the corresponding network element in the network may be as shown in Table 1.

TABLE 1

| Input data type | Meaning | Example |
|---|---|---|
| Network slice identifier | Identifies a network slice | For example, NSSAI, S-NSSAI, and an NSI |
| DNN | Indicates a data network | For example, an IMS or the internet |
| Area information | Indicates an area or location | For example, a TA, a TA list, or a cell list |
| Sampling timestamp | Indicates a time point of sampling | For example, 08:00:00 or 08:01:00 |
| Network device identifier | Indicates a network device NF | For example, an AMF ID or a UPF ID |
| Network device load | Indicates load of a network device | For example, "high" or "90%" |
| Network device fault status | Indicates whether a fault occurs in a network device | For example, "Yes" or "No" |
| Network device temperature | Indicates a temperature of a network device | For example, 75° C. or 30° C. |
| Resource usage of a device | Indicates a resource usage status of a device | For example, a CPU usage is 90%, or a memory usage is 98% |
| Terminal device identifier | Identifies one or more terminal devices in the network | For example, an IMSI, a GPSI, or an IMSI group |
| Reconnection rate of a terminal device | Indicates a quantity of times of initiating reconnection by one or more terminal devices in a unit time | For example, three times per second for a single user, or 1000 person-times per second for a plurality of users |
| Disconnection rate of a terminal device | Indicates a quantity of times of disconnection of one or more terminal devices in a unit time | For example, three times per second for a single user, or 500 person-times per second for a plurality of users |

TABLE 1-continued

| Input data type | Meaning | Example |
| --- | --- | --- |
| Quantity of PDU sessions of a terminal device | Indicates a quantity of PDU sessions initiated by a terminal device | For example, 8 |

The NSSAI refers to network slice selection support information. The S-NSSAI refers to single network slice selection support information (single NSSAI). The NSI refers to a network slice instance. The IMS refers to an IP multimedia subsystem. The TA refers to a tracking area. The IMSI refers to an international mobile subscriber identity. The GPSI refers to a generic public subscription identifier.

Certainly, the input data collected by the first data analytics network element described in Table 1 is merely used as an optional example. In another possible implementation, the input data may include another type of data, for example, a registration success rate of a terminal device. Alternatively, the input data may include some types of data in Table 1. This is not limited in this embodiment.

In addition, when the first data analytics network element is requested to perform status analysis of different exception types, the first data analytics network element may obtain different input data. For example, when the first data analytics network element is requested to analyze the exception type of the network device fault, data types obtained by the first data analytics network element may include: a slice identifier, the sampling time, the area information, the network device identifier, the network device load, the network device temperature, resource usage of the network device, and the like. For another example, when the first data analytics network element is requested to analyze the exception type of the network attack, data types obtained by the first data analytics network element may include: the slice identifier, the DNN, the sampling time, the area information, network average traffic, network peak throughput, the network device identifier, the network device load, the resource usage of the network device, the terminal device identifier, the reconnection rate of the terminal device, a registration failure rate of the terminal device (or a quantity of times of registration failure of the terminal), a session success rate of the terminal device (or a session failure rate of the terminal device), and the like.

After obtaining the input data, the first data analytics network element may obtain the status analytics output of the target object through analyzing and inferring by using a pre-trained model. The model may be obtained through training the first data analytics network element based on corresponding sample data, or may be sent to the first data analytics network element after training is completed by a dedicated model training platform. The model obtained through training may represent an association relationship between the input data and whether a status is abnormal. Further, the model may represent association relationships between the input data and an exception type, an exception subtype, a second exception reason, an exception level, an exception trend, and the like. In this case, the status analytics output of the target object that is generated by the first data analytics network element not only may include information indicating whether the target object is in an abnormal state, but also may include any one or more of the following information: the exception type, the exception subtype, the second exception reason, the exception level, the exception trend, or the like (where in this case, the target object is in an abnormal state). The exception trend refers to an exception progress condition when a target object is in an abnormal state. For example, the exception trend may be a development trend that describes an exception condition of the target object by defining, for example, "rising" (representing that the exception condition is aggravated), "decreasing" (representing that the exception condition is alleviated), "stable" (representing that the exception condition is stable), or "unknown". Certainly, the status analytics output of the target object may include only information indicating whether the target object is in an abnormal state. In some examples, the exception level may be specifically a quantitative value. For example, the exception level may be represented as a degree value such as "high", "medium", or "low", or may be represented as a specific value.

Optionally, status indication information that is included in the status analytics output of the target object may indicate whether the target object is in a normal state or in an abnormal state. In a possible implementation, the status indication information may further indicate that the target object is in an unknown state. That is, the first data analytics network element may not be capable of determining, based on the obtained input data, whether the target object is in a normal state or in an abnormal state. In this case, it may be considered that the target object is in an unknown state. In this implementation, the first data analytics network element may feed back to the second data analytics network element that the target object is in any one of a normal state, an abnormal state, or an unknown state.

The status analytics output of the target object may be an analytics output (statistics) of a historical status of the target object. For example, when the target object is specifically one or more network devices, the input data obtained by the first data analytics network element may include two types of data: load and a CPU usage of the network device in a past period of time. In this way, if the first data analytics network element determines that the load of the network device is lower than a first preset value and the CPU usage is higher than a second preset value, it may be inferred that the network device is in an abnormal state in the past period of time. For example, the CPU usage may be excessively high due to a network attack. It should be noted that although a real-time requirement is high for an analytics output of a current status of the target object, the analytics output may be classified into the analytics output of a historical status of the target object because the current status belongs to an occurred status of the target object.

Alternatively, the status analytics output of the target object may be an analytics output (prediction) of a future status of the target object. For example, when the target object is specifically one or more terminal devices, the input data obtained by the first data analytics network element may include temperature data of the terminal device in a past period of time (that is, an observation time period). Although the temperature data of the terminal device in the observation time period is in a normal state, for example, is always less than 60° C., if the temperature data of the terminal device is continuously increasing in the observation time period, the first data analytics network element may predict, based on a current temperature increasing trend of the terminal device, that a temperature of the terminal device in a future time period may exceed 60° C. In this way, the first data analytics network element may predict that the temperature data of the terminal device in the future time period is abnormal, that is, it is predicted that the terminal device is in an abnormal state in the future time period.

Further, the status analytics output of the target object may have a corresponding confidence level (referred to as a second confidence level hereinafter for ease of description). The second confidence level may be used to represent a trustworthiness level of the status analytics output indicating a normal state/an abnormal state. For example, when the second confidence level is 70%, it is represented that a trustworthiness level of that the target object is in a normal (or an abnormal) state is 70%, and correspondingly, a trustworthiness level of that the target object is in an abnormal (or a normal) state is 30%.

Optionally, when the first request message carries the first time information and/or the first area information, the status analytics output of the target object generated by the first data analytics network element may be an analytics output corresponding to data in the first time information and/or the first area information (observation area information).

For ease of understanding the status analytics output of the target object that is fed back by the first data analytics network element, an example in which a status of the target object is specifically a network attack state is used to describe the status analytics output in the following.

As shown in Table 2, when the first data analytics network element analyzes whether the target object is in a network attack state, the status analytics output of the target object may specifically include the following content.

TABLE 2

| Output data type | Meaning | Example |
| --- | --- | --- |
| Slice ID | Identifies a network slice | For example, NSSAI, S-NSSAI, and an NSI |
| DNN | Indicates a data network | For example, an IMS or the internet |
| Area information | Indicates an area or location | For example, a TA, a TA list, or a cell list |
| Terminal device identifier (optional) | Identifies one or more terminal devices in the network | For example, an IMSI, a GPSI, or an IMSI group |
| Observation time period information | Indicates a time period | For example, 08:00 to 09:00 |
| Information about a network attack state | Includes analytics information about a network attack | / |
| >Network attack state | Indicates whether a network is in a state of being attacked | "Yes" or "No" |
| >Subtype of a network attack | Indicates a specific type of a network attack | For example, a DOS attack, network tampering, or user identity masquerade |
| >Network attack degree | Indicates severity of the network attack | For example, "high" or "low"; or "80%" |
| >Network attack trend | Indicates a trend of the network attack | For example, rising, decreasing, or stable |
| Confidence level (optional) | Indicates a trustworthiness level of an output result | For example, "high" or "low"; or "99%" |
| Alarm information | Used to give an alarm about specific information to a subscription object | For example, giving an alarm about taking a defense measurement to a network device that is under network attack, or sending apology information or alarm information to a user of a terminal device |

Further, the first data analytics network element may feed back the status analytics output of the target object to the second data analytics network element only when the target object is in an abnormal state, to notify the second data analytics network element that the target object is in an abnormal state. In an example, the second data analytics network element (or another network element) may send second indication information to the first data analytics network element, where the second indication information may indicate the first data analytics network element to feed back a status analytics output of the target object when the target object is in an abnormal state. For example, the second indication information may be carried in the first request message and sent to the first data analytics network element together with the first request message. In this way, when determining that the target object is in an abnormal state, the first data analytics network element sends the status analytics output of the target object to the second data analytics network element. When determining that the target object is in a normal state, the first data analytics network element may not feed back the status analytics output of the target object to the second data analytics network element. Correspondingly, when the second data analytics network element does not receive the status analytics output of the target object, the second data analytics network element may consider by default that the target object is in a normal state, so that a quantity of times of data communication and a data volume between the first data analytics network element and the second data analytics network element can be reduced, saving network resources.

It should be noted that, in addition to the first data analytics network element and the second data analytics network element, a communication network may further include another data analytics network element. In this case, after determining that the target object is in an abnormal state, the first data analytics network element feeds back the status analytics output of the target object to the second data analytics network element, and may further feed back the status analytics output of the target object to the another data analytics network element.

In an example, the first data analytics network element may directly feed back the status analytics output of the target object to the second data analytics network element. Alternatively, the first data analytics network element may send the status analytics output of the target object to a fourth network element, and the fourth network element stores the status analytics output of the target object. When the second data analytics network element needs to obtain the status analytics output of the target object, the second data analytics network element may obtain the required status analytics output from the fourth network element. In this way, the fourth network element may store status analytics outputs of different target objects that are generated by data analytics network elements in the network, and the fourth network element uniformly provides a status analytics output required by another data analytics network element to the another data analytics network element. For example, the fourth network element may be, for example, the UDM network element, a user data repository (UDR) network element, or a network repository function (NRF) network element.

Further, before sending the first request message to the first data analytics network element, the second data analytics network element may alternatively query for a specific data analytics network element that provides a service of generating a status analytics output of a target object. Different data analytics network elements may have different functions. For example, some data analytics network elements may analyze and determine whether the target object is in a network attack state, while other data analytics network elements may analyze and determine whether the target object is in a network overload state.

Specifically, the second data analytics network element may send a query request to a fifth network element, where the query request is used to request the fifth network element to query for the first data analytics network element that generates the status analytics output of the target object. For example, the query request may carry one or more information such as a slice identifier, a service area identifier, an exception type identifier, or an exception subtype identifier. The fifth network element may respond to the query request, and find, from pre-stored attribute information (profile) corresponding to each data analytics network element, identification information of the first data analytics network element that matches the query request. For example, a first data analytics network element that analyzes whether the target object is in a network attack state is found, and identification information of the first data analytics network element is sent to the second data analytics network element. In this way, the second data analytics network element in the communication system may send, based on the identification information of the first data analytics network element, the first request message to the first data analytics network element, to request the first data analytics network element to feed back the status analytics output of the target object. For example, the identification information of the first data analytics network element may be, for example, an IP address of the first data analytics network element, or a fully qualified domain name (FQDN) of the first data analytics network element. The fifth network element may be, for example, the NRF network element or the UDM network element.

It should be noted that the first data analytics network element and the second data analytics network element in this embodiment may be different network elements separately deployed. In another possible implementation, the first data analytics network element and the second data analytics network element may alternatively be integrated into a same network element. In this case, data exchange between the first data analytics network element and the second data analytics network element may be omitted as appropriate.

S203: The second data analytics network element obtains, based on the received status analytics output of the target object, first input data corresponding to a target type of analytics. When the status analytics output of the target object indicates that the target object is in an abnormal state, the first input data may not include data corresponding to the target object.

S204: The second data analytics network element may generate, based on the first input data, a first analytics output corresponding to the target type of analytics.

When the target object is in an abnormal state, an error may occur in the data corresponding to the target object. In this case, when the second data analytics network element performs corresponding analysis based on the data of the target object that includes the error, correctness of the obtained first analytics output may be affected. Therefore, in this embodiment, after receiving the status analytics output of the target object from the first data analytics network element, if the second data analytics network element determines that the target object is in an abnormal state, for example, determines, based on the status indication information in the status analytics output, that the target object is in an abnormal state, when a corresponding analytics output (referred to as a first analytics output below) is generated, it may be determined whether input data for generating the first analytics output includes related data of the target object. If the input data for generating the first analytics output includes the related data of the target object, the input data needs to be adjusted, so that the input data does not include the error data of the target object. The first analytics output is obtained based on the first input data that does not include the error data. Correspondingly, correctness of the first analytics output may also be improved. If the input data for generating the first analytics output does not include the related data of the target object, the input data may not need to be adjusted.

The data corresponding to the target object may be data that is related to the target object and that is required for generating a corresponding analytics output for the target object. For example, when the target object is a terminal device, data corresponding to the target object may be data related to generating a service quality analytics output of the terminal device, for example, a service MOS generated by the terminal device in the AF network element, location information generated by the terminal device in the AMF network element, or service flow data generated by the terminal device in the UPF network element. For another example, when the target object is a network device NF network element, the data corresponding to the target object may be NF-related data, for example, NF load data.

The first analytics output may be an analytics output corresponding to the target type of analytics and generated by the second data analytics network element for the first network element (that is, another network element in the network). For example, when the first network element is the AMF network element, the first analytics output may be a movement track analytics output that is of a terminal device in an area and that is generated by the second data analytics network element at a request of the AMF network element. The movement track analytics output may represent movement track information of a terminal object in the area. Alternatively, the first analytics output may be a service quality analytics output generated by the second data analytics network element at a request of a PCF network element. The service quality analytics output may represent service quality of the terminal device that executes the service, or the like. Correspondingly, input data obtained by the second data analytics network element is data required for analyzing an analytics output of a target type of analytics (for example, a movement track analytics type of the terminal device or a service quality analytics type of the terminal device). In this embodiment, the first network element may be the AMF network element or the PCF network element, or may be another network element such as the AF network element, the UDM network element, or the RAN network element in the network. After generating the first analytics output, the second data analytics network element may send the first analytics output to the first network element.

In an example, the second data analytics network element may adjust the input data corresponding to the first analytics output in a manner of removing data. Specifically, when the second data analytics network element needs to generate the first analytics output, the second data analytics network element may obtain, from a corresponding network element in the network, third input data required for generating the first analytics output, where the third input data includes data corresponding to the target object. In this case, if the second data analytics network element receives the status analytics output of the target object, and the status analytics output represents that the target object is in an abnormal state, the second data analytics network element may delete the data corresponding to the target object from the third input data.

The first input data (that is, a remaining part of the third input data) is obtained, and the corresponding first analytics output is generated based on the first input data. Alternatively, when a second network element in the network feeds back the data corresponding to the target object to the second data analytics network element, the second data analytics network element may refuse to receive the data corresponding to the target object that is sent by the second network element.

In another example, the input data may be adjusted in a manner of canceling data subscription. Specifically, the second data analytics network element may send a subscription message to a corresponding network element in the network in advance, so as to subscribe, from the corresponding network element in the network, to input data required for generating the first analytics output. The input data may include data corresponding to the target object that is subscribed from the second network element. Other data included in the input data may be obtained by subscribing from a third network element, where the third network element may include one or more network elements. When the second data analytics network element determines, based on the received status analytics output of the target object, that the target object is in an abnormal state, the second data analytics network element may send a subscription cancelation message to the second network element. The subscription cancelation message may indicate the second network element to stop feeding back data corresponding to the target object to the second data analytics network element. If the third network element does not receive the subscription cancelation message, the third network element may continue to feed back other input data to the second data analytics network element based on an indication of the previous subscription message. Sequentially, the second data analytics network element is enabled to obtain the first input data that may not include the data corresponding to the target object.

It should be noted that, after sending the subscription cancelation message to the second network element, the second data analytics network element may unsubscribe from data corresponding to all objects on the second network element, where the data is used to generate an analytics output, and the all objects include the target object in an abnormal state and an object in a normal state. In this case, in a process of generating the first analytics output, the first input data of the second data analytics network element may not include the data of any object on the second network element. Alternatively, after sending the subscription cancelation message to the second network element, the second data analytics network element unsubscribes only from data corresponding to the target object in an abnormal state. For data corresponding to another object in a normal state on the second network element, the second network element may still feed back the data corresponding to the object in a normal state to the second data analytics network element, and use the data as a part of the first input data.

In another manner of unsubscribing data subscription, the second data analytics network element may alternatively send the subscription message periodically or based on a requirement. When the second data analytics network element determines, based on the received status analytics output of the target object, that the target object is in an abnormal state, the second data analytics network element may not send a data subscription message for the target object to the second network element, but send a data subscription message to the third network element, so as to obtain the first input data that does not include the data corresponding to the target object.

Optionally, input data corresponding to all analytics outputs that are generated by the second data analytics network element may not include data corresponding to the target object. Therefore, the second data analytics network element may, alternatively, first determine an analytics output related to the target object in an abnormal state or a type of analytics (for example, analytics ID) corresponding to the analytics output. In other words, the second data analytics network element may determine a type of analytics (for example, analytics ID), where the data corresponding to the target object in an abnormal state affects an analytics output corresponding to the type of analytics. If the data corresponding to the target object does not participate in generation of the analytics output corresponding to the target type of analytics, the second data analytics network element may not need to adjust the generated analytics output corresponding to the target type of analytics. For example, when the second data analytics network element generates analytics outputs of two types of analytics: a service MOS analytics type and a network performance analytics type, whether a fault occurs in an NF network element may not affect accuracy of the analytics outputs corresponding to the two types of analytics. However, after a fault occurs in one (or more) terminal device UE, the accuracy of the analytics outputs corresponding to the two types of analytics may be affected. Therefore, when a target object in an abnormal state is the terminal device UE, the second data analytics network element may determine to adjust input data for generating the analytics outputs of the two types of analytics, so that the input data does not include data corresponding to the terminal device UE. When a target object in an abnormal state is the NF network element, the second data analytics network element may not need to adjust input data for generating the analytics outputs of the two types of analytics.

For example, when a status analytics output of a target object that is received by the second data network analytics network element corresponds to first time information and/or first area information, if the status analytics output indicates that the target object is in an abnormal state, it indicates that the target object generates abnormal data in a time period indicated by the first time information and/or in an area indicated by the first area information. In this case, when the second data analytics network element generates a first analytics output, first input data may not include the data generated by the target object in the time period indicated by the first time information and/or the data generated by the target object in the area indicated by the first area information.

Optionally, in a process in which the second data analytics network element generates the first analytics output, when the second data analytics network element receives the status analytics output of the target object that is sent by the first data analytic network element, the second data analytics network element further receives a second confidence level corresponding to the status analytics output. The second data analytics network element may further determine, based on a value of the second confidence level, whether to adjust the input data. Specifically, when the second data analytics network element determines, based on the status analytics output of the target object, that the target object is in an abnormal state, the second confidence level corresponding to the status analytics output is also greater than a first threshold. In this case, the second data analytics network element may determine to adjust the input data required for generating the first analytics output, so that the adjusted input data does not include the data corresponding to the target object. When the second confidence level corresponding to the status analytics output is not greater than the first threshold, even if the status analytics output of the target object represents that the target object is in an abnormal state, the second data analytics network element may not adjust the input data.

After generating the first analytics output, the second data analytics network element may send the first analytics output to the first network element, so that the first network element performs corresponding processing based on the first analytics output. For example, when the first analytics output is specifically an analytics output for a movement track of a terminal device in an area, the first network element may determine, based on the analytics output for the movement track of the terminal device in the area, whether a specified terminal device exists in the area, where a movement track of the specified terminal device overlaps the movement track of the terminal device. For another example, when the first analytics output is specifically a service quality analytics output for a service type, the first network element may determine, based on service quality of the service type, whether to adjust a corresponding QoS policy for the service type. In this embodiment, a processing process performed by the first network element and a processing process performed by the first network element based on the first analytics output are not limited, and may be applied to any applicable scenario.

Further, the second data analytics network element may alternatively send the status analytics output of the target object and the target type of analytics (for example, analytics ID) to the first network element, so that the first network element determines, based on information related to that the target object is in an abnormal state, whether to disable a second analytics output corresponding to the target analytics type or reduce a confidence level of the second analytics output corresponding to the target type of analytics. For example, when the second data analytics network element generates analytics outputs of two types of analytics: a service MOS analytics type and a network performance analytics type, and a target object is a terminal device UE, the second data analytics network element may send both a status analytics output of the UE and the two types of analytics (identifiers) of the service MOS and the network performance to the first network element, so that the first network element performs corresponding determining and processing operations.

In an example, the first network element may request the second data analytics network element to generate the first analytics output. Specifically, the first network element may send a second request message to the second data analytics network element. The second request message may carry the target type of analytics, for example, may be an analytics ID. The target type of analytics indicates a type of analytics output generated by the second data analytics network element. The second data analytics network element may generate, based on the second request message sent by the first network element, the first analytics output corresponding to the target type of analytics, and send the first analytics output to the first network element.

In a possible implementation, the first analytics output may correspond to a specific time period and/or a specific area. For example, when sending the first analytics output to the first network element, the second data analytics network element may further send third time information and/or third area information applicable to the first analytics output to the first network element. The third time information may indicate a time period in which the first network element is suitable to use the first analytics output to perform a corresponding processing operation. The third area information may indicate an area in which the first network element is suitable to use the first analytics output to perform the corresponding processing operation. The third time information may be determined by the second data analytics network element based on the first time information. For example, a time period indicated by the third time information may be a subset of a time period indicated by the first time information. The third area information may be determined by the second data analytics network element based on the first area information. For example, the area indicated by the third area information may be a subset of an area indicated by the first area information.

Every time after the second data analytics network element generates an analytics output, the second data analytics network element may send the analytics output to the first network element. In another implementation, after generating the first analytics output, the second data analytics network element may compare and determine whether the first analytics output is the same as a second analytics output previously sent to the first network element. If it is determined that the first analytics output is the same as the second analytics output, the second data analytics network element may not need to send the first analytics output to the first network element. Correspondingly, the first network element continues to perform a corresponding processing process based on the second analytics output. If it is determined that the first analytics output is different from the second analytics output, the second data analytics network element may send the first analytics output to the first network element. In still another implementation, the second data analytics network element may alternatively send the first analytics output to the first network element when determining that first input data for an analytics output of a same target type of analytics does not include the data corresponding to the target object.

In a possible implementation, when feeding back the first analytics output to the first network element, the second data analytics network element may further feed back a third confidence level, where the third confidence level may indicate a trustworthiness level of the first analytics output. For example, when the first analytics output is specifically a service quality analytics output of a service type, the third confidence level may be used to represent that the terminal device has a high trustworthiness level of service quality. When a value of the third confidence level is large, for example, greater than a preset second threshold, the first network element may perform a corresponding processing process based on the first analytics output. When the value of the third confidence level is small, for example, not greater than the second threshold, it indicates that the trustworthiness of the first analytics output is not high. In this case, the first network element may perform a corresponding processing process not based on the first analytics output. For example, the first network element may perform a corresponding processing process based on the second analytics output previously fed back by the second data analytics network element. A value of the third confidence level is affected by the second confidence level and the first input data. Therefore, the third confidence level may be determined based on the second confidence level and the first input data corresponding to the generated first analytics output.

Optionally, after determining that the target object is in an abnormal state, the second data analytics network element may send first indication information to the first network element, where the first indication information indicates the second data analytics network element to disable a second analytics output or lower a confidence level corresponding to the second analytics output to a first confidence level. The second analytics output is an analytics output of the target type of analytics that is previously generated based on second input data by the second data analytics network element, and sent to the first network element. The second input data includes data corresponding to the target object.

Because the second analytics output previously fed back by the second data analytics network element to the first network element is generated based on the second input data including the data corresponding to the target object, and an error may occur in the data corresponding to the target object because the target object is in an abnormal state, accuracy of the second analytics output generated based on the data is reduced, and correspondingly, a trustworthiness level of the second analytics output is also reduced. Based on this, in a possible implementation, when determining that the target object is in an abnormal state, the second data analytics network element may send disable indication information for the second analytics output to the first network element, to indicate the first network element to disable the second analytics output, cancel a related operation performed based on the second analytics output, or refuse to continue to perform a corresponding operation based on the second analytics output.

In another possible implementation, when determining that the target object is in an abnormal state, the second data analytics network element may reduce the confidence level of the second analytics output by sending the first indication information to the first network element. Specifically, the confidence level corresponding to the second analytics output may be lowered to the first confidence level. In this way, the first network element may determine, based on the first confidence level of the second analytics output, to perform a corresponding processing process. For example, the second analytics output is a network performanceanalytics output. When receiving the second analytics output, the first network element determines that the confidence level of the second analytics output is 90%, representing that a network load is high. Therefore, the first network element needs to perform a processing operation of adding a resource on the network. When the first network element receives the first indication information, and the first indication information indicates to lower the confidence level of the second analytics output to 30%, it is represented that a probability that the network load is high is low, that is, a probability that the network is still in a light-load state is high. In this case, the first network element may temporarily not perform a processing operation of adding a network resource.

Further, the second data analytics network element may send, to the first network element, a reason for sending the first analytics output and/or the first indication information. Specifically, the second data analytics network element may send a first exception reason to the first network element. The first exception reason may indicate a reason why the second data analytics network element sends the first analytics output and/or first indication information to the first network element. For example, the first exception reason may indicate that the confidence level corresponding to the second analytics output is lowered because the second input data includes the data of the target object in an abnormal state, where the second analytics output is previously generated based on the second input data. Alternatively, the first exception reason may indicate that the second analytics output previously sent by the second data analytics network element is inaccurate, or the like. Further, the first exception reason may alternatively indicate an exception type of the second analytics output. For example, the first exception reason indicates that the target object is under a DOS attack.

Optionally, the second input data for generating the second analytics output may include not only data corresponding to the target object, but also data corresponding to another object. For example, the second data analytics network element may generate a second analytics output based on data corresponding to 50 objects (for example, 50 objects in a network slice), and only one or two target objects of the 50 objects may be abnormal. When the second data analytics network element generates a second analytics output based on data corresponding to a first quantity of objects, and a second quantity of target objects in the first quantity of objects are in an abnormal state, if the first quantity is far greater than the second quantity, for example, a difference or a ratio between the first quantity and the second quantity is greater than a first value, accuracy of the second analytics output may be slightly affected by the first quantity of target objects. In this case, the second data analytics network element may not send disable indication information or first indication information to the first network element (or even if the first indication information is sent, a value by which a confidence level is lowered may be less than a second value). When the difference between the first quantity and the second quantity is small, the second data may send the disable indication information or the first indication information to the first network element based on the foregoing implementation.

Optionally, when determining, based on a first analytics output generated by the first data analytics network element, that the target object is in an abnormal state, the second data analytics network element may send only the disable indication information or the first indication information to the first network element, to notify that the first network element disables the second analytics output previously fed back by the second data analytics network element, or lowers the confidence level of the second analytics output, and may not need to obtain the first input data or generate the first analytics output.

Alternatively, after determining that the target object is in an abnormal state, the second data analytics network element may not send the disable indication information or the first indication information to the first network element, but may send the information related to that the target object is in an abnormal state to the first network element. The information related to that the target object is in an abnormal state may be, for example, any one or more of the following information: indication information of the target object, status indication information, an exception type, an exception subtype, an exception reason, an exception level, or an exception trend. In this way, the first network element may determine, based on the information sent by the second data analytics network element, whether to disable the second analytics output or lower the confidence level of the second analytics output. For example, when the information related to that the target object is in an abnormal state includes the exception trend and the exception trend is represented as "rising", the first network element may determine, based on exception trend information, to still perform a corresponding processing operation based on the second analytics output from 8:00 to 10:00, and disable the second analytics output (for example, discard the second analytics output) from 10:00 to 24:00 (or any time after 10:00), or refuse to continue using the second analytics output to perform the corresponding processing operation.

In a possible implementation, the first indication information sent by the second data analytics network element to the first network element may correspond to a specific time period or a specific area, representing that a confidence level of the first analytics output in the time period or the area is lowered, but a confidence level in another time period or another area does not need to be lowered. During specific implementation, when feeding back the first indication information, the second data analytics network element may further send second time information and/or second area information corresponding to the first indication information to the first network element, where the second time information indicates a time period corresponding to a first confidence level that is lowered, that is, a confidence level of the first analytics output within the time period indicated by the second time information is the first confidence level. The confidence level of the first analytics output in another time period may be higher than the first confidence level. The second area information indicates an area corresponding to the first confidence level, that is, a confidence level of the first analytics output in the area indicated by the second area information is the first confidence level. The confidence level of the first analytics output in another area may be higher than the first confidence level. In this way, after receiving the second time information and/or the second area information, the first network element may determine whether an incorrect processing operation has been performed in the past based on the second analytics output and the confidence level corresponding to the second analytics output. Alternatively, the first network element may determine a time period and/or an area in which the second analytics output is disabled. In this way, correctness of the processing operation performed by the first network element is improved.

The second time information may be determined by the second data analytics network element based on the first time information. For example, a time period indicated by the second time information may be a subset of a time period indicated by the first time information. Alternatively, a time period indicated by the second time information may be a time period that is predicted by the second data analytics network element. The first analytics output is available in the time period indicated by the second time information. The second area information may be determined by the second data analytics network element based on the first area information. For example, the area indicated by the second area information may be a subset of an area indicated by the first area information.

Alternatively, when feeding back the first indication information, the second data analytics network element sends the second time information to the first network element, which may also indicate available time of the first analytics output. For example, the second analytics output may predict a future time period in which the first analytics output is available. For example, when the second data analytics network element determines that the first analytics output is available in three hours in the future, start time in three hours in the future may be used as available time of the first analytics output, so that the first network element performs, based on the available time indicated by the second time information, an operation corresponding to the first analytics output.

In this embodiment, the status analytics output of the target object that is received by the second data analytics network element from the first data analytics network element may represent whether the target object is in an abnormal state. When the target object is in an abnormal state, an error may occur in the data corresponding to the target object. Therefore, when the status analytics output of the target object indicates that the target object is in an abnormal state, the first input data corresponding to the target type of analytics obtained by the second data analytics network element may not include the data corresponding to the target object. In this way, the first analytics output corresponding to the target type of analytics that is generated by the second data analytics network element based on the first input data may not be affected by the incorrect data corresponding to the target object, so that the correctness of the first analytics output can be improved.

In the foregoing embodiments, a second data analytics network element adjusts input data based on a status analytics output determined by a first data analytics network element, and a first network element performs a corresponding processing operation based on a first analytics output fed back by the second data analytics network element. In another possible embodiment, the first network element may alternatively directly obtain a status analytics output of a target object that is generated by the first data analytics network element, and determine, based on the status analytics output of the target object, whether the target object is abnormal. When determining that the target object is abnormal, the first network element may perform an operation performed by the first network element and/or the second data analytics network element. For example, the first network element may lower a confidence level of an analytics output related to data corresponding to the target object, disable an obtained analytics output generated based on the data corresponding to the target object, or cancel or modify a related operation previously performed based on the analytics output.

Figure 3:
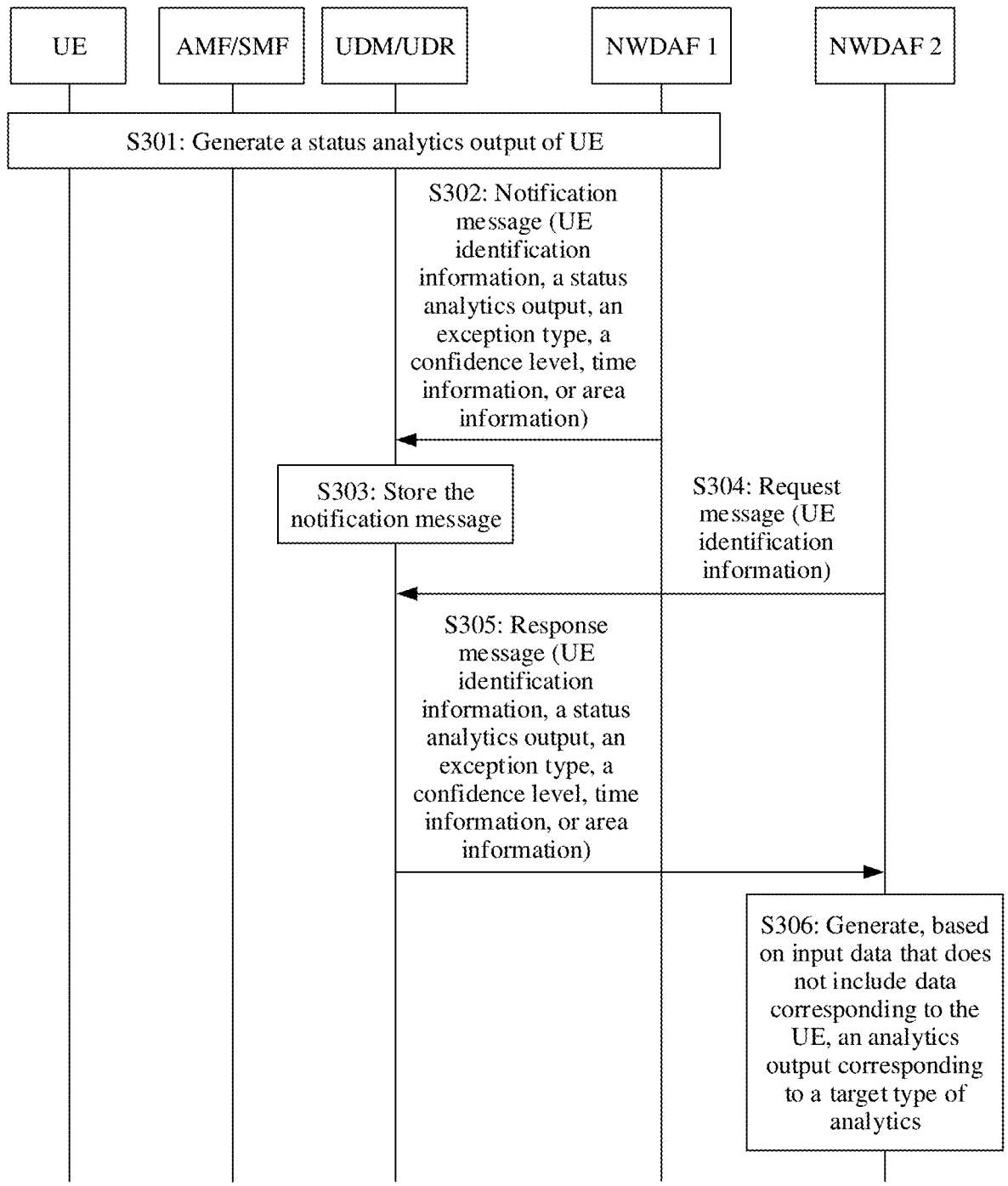
FIG. 3 is a schematic diagram of signaling exchange of a communication method with reference to a specific scenario according to an embodiment of this application.

For ease of understanding, the following describes technical solutions in embodiments of this application by using an example with reference to a specific scenario in which a target object is specifically a terminal device UE. In this scenario, NWDAFs in a network may include at least an NWDAF 1 and an NWDAF 2. Certainly, in another scenario, more NWDAFs such as an NWDAF 3 and an NWDAF 4 may be further included. It should be noted that the scenario embodiment shown in FIG. 3 is merely used as an example for description, and is not intended to limit specific implementation of the technical solutions in embodiments of this application to the example shown in FIG. 3. For example, in another embodiment, steps and/or information content shown in FIG. 3 may be added, deleted, or replaced as appropriate. For example, the following notification message may include any one or more of terminal device identification information, a status analytics output, a confidence level, an exception type, time information, or area information. For specific implementation details of some implementations, refer to related descriptions in the foregoing solution embodiments. The method may specifically include the following steps.

S301: The NWDAF 1 generates a status analytics output of UE.

In this embodiment, the NWDAF 1 may monitor one or more UEs to determine whether the UE is in an abnormal state. During specific implementation, the NWDAF 1 may obtain related data of the UE from the UE and another network element (such as an AMF, an SMF, a UDM, or a UDR) in the network, and generate a status analytics output for the UE based on the data. The status analytics output may indicate whether the UE is in an abnormal state.

The NWDAF 1 may be configured to actively monitor a status of the UE, so as to determine, based on the generated status analytics output, whether the UE is in an abnormal state. Certainly, in another possible scenario, the NWDAF 2 or another network element in the network may request the NWDAF 1 to monitor whether the UE is in an abnormal state.

S302: The NWDAF 1 sends a notification message to a UDM/UDR, where the notification message may include UE identification information, a status analytics output, an exception type, a confidence level, time information, or area information.

When determining, based on the status analytics output, that the UE is in an abnormal state, the NWDAF 1 may determine an exception type when an abnormality occurs on the UE, and determine a confidence level when the UE is in an abnormal state, time information and area information when the UE is in an abnormal state, or the like. Then, the NWDAF 1 may generate the notification message based on the information, and send the notification message to the UDM/UDR for storage. The status analytics output may be represented as normal or abnormal to reflect whether the UE is in an abnormal state. Alternatively, the status analytics output may be represented as a value. For example, "0" is used to represent that the UE is in an abnormal state, while "1" is used to represent that the UE is in a normal state. The exception type may include types such as a DOS attack, excessively frequent service access, abnormal data traffic, ping-ponging of UE, an abnormal UE location, abnormal sleep/wakeup, and an incorrect destination address. The time information may represent an observation time period in which the NWDAF 1 observes that the UE is in an abnormal state, that is, whether the UE is in a normal state or an abnormal state within the observation time period. The area information may represent an area corresponding to that the NWDAF 1 determines that the UE is in a normal state or an abnormal state. For example, the NWDAF 1 determines that the UE is in a normal state when the UE is located in an area 1, and that the UE is in an abnormal state when the UE is located in an area 2. The confidence level may represent a trustworthiness level of that the NWDAF 1 determines that the UE is in a normal state or an abnormal state. The confidence level may be represented in a form of a level, for example, "high", "medium", or "low", where "high" represents a high trustworthiness level of that the NWDAF 1 determines that the UE is in a normal state or an abnormal state, while "low" represents a low trustworthiness level of that the NWDAF 1 determines that the UE is in a normal state or an abnormal state. Alternatively, the confidence level may be represented as a value, for example, "3", "2", or "1", where "3" represents a high trustworthiness level of that the NWDAF 1 determines that the UE is in a normal state or an abnormal state, while "1" represents a low trustworthiness level of that the NWDAF 1 determines that the UE is in a normal state or an abnormal state.

When the NWDAF 1 determines, based on the status analytics output, that the UE is in a normal state, the notification message sent by the NWDAF 1 to the UDM/UDR may include only UE identification, a status analytics output, a confidence level, time information, area information, or the like.

In a further possible implementation, the NWDAF 1 may send the notification message to the UDM/UDR only when determining that the UE is in an abnormal state, and does not send the notification message when determining that the UE is in a normal state. In this way, a data volume sent by the NWDAF 1 may be reduced, and a data volume stored in the UDM/UDR may also be reduced, so that consumption of network resources can be reduced.

S303: The UDM/UDR stores the notification message.

Specifically, that the UDM/UDR stores the notification message may be storing the UE identification information, a status analytics output, an exception type, a confidence level, time information, and area information that are included in the notification message. During specific implementation, the UDM/UDR may store the notification message in context data or subscription data of the UE.

In another possible embodiment, when the target object is specifically a network device, for example, an NF network element, the NWDAF 1 may send a notification message for the network device to the NRF network element, and store the notification message in the NRF network element. Correspondingly, when the NWDAF 2 needs to obtain a status analytics output of the network device, the NWDAF 2 may request the status analytics output of the network device from the NRF network element.

S304: The NWDAF 2 sends a request message to the UDM/UDR, where the request message requests a status analytics output of the UE.

When input data required by the NWDAF 2 to generate an analytics output corresponding to a target type of analytics includes data corresponding to the UE, or the NWDAF 2 determines that sample data of the UE needs to be collected from a data provider (such as an AF, an NF, or UE) as training data, the NWDAF 2 may send a request message to the UDM/UDR, to request the UDM/UDR to feed back a status analytics output of the UE, so that the NWDAF 2 determines whether the UE is in an abnormal state. For example, in a possible scenario, the NWDAF 2 needs to perform related analysis training work (for example, analyze movement track information of one or more UEs) for a specific user or group. In this case, the NWDAF 2 may obtain sample data of the specific user or group as training data, or obtain another analytics output of the specific user or group as the input data. Before this, the NWDAF 2 may first request to obtain a status analytics output of UE of the specific user or group, so as to determine whether the UE is in an abnormal state. A request message includes UE identification information corresponding to the specific user or UE group identification information corresponding to the group. For another example, in a possible scenario, the NWDAF 2 needs to perform analysis work of analyzing a network granularity (for example, analyzing network load), an area granularity (for example, analyzing a quantity of users in an area), or a service granularity (for example, analyzing service experience). In this case, the NWDAF 2 may obtain sample data of a large quantity of users in a network or an area as training data, or needs to obtain other analytics outputs of a large quantity of users in a network or an area as input data. Before this, the NWDAF 2 may first request to obtain status analytics outputs of UE corresponding to the large quantity of users, so as to determine whether the UE is in an abnormal state. A request message includes network identification information (such as a PLMN ID or S-NSSAI) or an area identifier (such as a TA list or a cell list) information.

Further, when the status analytics output of the UE represents that the UE is in a normal state, the UDM/UDR may not feed back the status analytics output of the UE to the NWDAF 2. Correspondingly, the NWDAF 2 may consider by default that the UE is in a normal state when the NWDAF 2 does not receive the status analytics output fed back by the UDM/UDR. When the status analytics output of the UE represents that the UE is in an abnormal state, the UDM/UDR feeds back the status analytics output of the UE to the NWDAF 2, to notify the NWDAF 2 that the UE is in an abnormal state, so that data volume transmitted between the NWDAF 2 and the UDM/UDR can be reduced, reducing consumption of network resources.

S305: The UDM/UDR feeds back a response message to the NWDAF 2, where the response message includes UE identification information, a status analytics output, an exception type, a confidence level, time information, or area information.

In a possible implementation, the response message fed back by the UDM/UDR to the NWDAF 2 may alternatively include only the status analytics output. For example, when the confidence level is greater than a preset threshold, it indicates that there is a high probability that the UE is in a normal state or an abnormal state, so that the UDM/UDR may only feed back the status analytics output to the NWDAF 2.

S306: When determining, based on the status analytics output in the response message, that the UE is in an abnormal state and a confidence level is greater than a preset threshold, the NWDAF 2 generates, based on input data that does not include the data corresponding to the UE, an analytics output corresponding to a target type of analytics.

When the UE is in an abnormal state, an error may occur in the data corresponding to the UE. As a result, when the NWDAF 2 performs corresponding analysis based on the data of the UE that includes the error, correctness of an obtained analytics output may be affected. Therefore, in this embodiment, when determining that the UE is in an abnormal state and the confidence level is greater than the preset threshold, the NWDAF 2 may generate a corresponding analytics output based on the input data that does not include the data corresponding to the UE, so as to avoid impact of the data corresponding to the UE on accuracy of the analytics output generated by the NWDAF 2, so that the accuracy of the analytics output is improved.

In an example implementation, when the NWDAF 2 determines that the UE is in an abnormal state and the confidence level is greater than the preset threshold, the NWDAF 2 may obtain, from a corresponding network element in the network, third input data required for generating the analytics output, where the third input data includes the data corresponding to the UE. Then, the NWDAF 2 may delete the data corresponding to the UE from the third input data, to obtain first input data (that is, a remaining part of the third input data); and generate a corresponding analytics output based on the first input data. Alternatively, when the corresponding network element in the network feeds back the data corresponding to the UE to the NWDAF 2, the NWDAF 2 may refuse to receive the data corresponding to the UE that is sent by the network element.

In another example implementation, the NWDAF 2 may send a subscription message to a corresponding network element in the network in advance, so as to subscribe, from the corresponding network element in the network, to input data required for generating the analytics output. The input data may include data corresponding to the target object that is subscribed from the second network element. Other data included in the input data may be obtained by subscribing from a third network element, where the third network element may include one or more network elements. When the NWDAF 2 determines that the UE is in an abnormal state and the confidence level is greater than the preset threshold, the NWDAF 2 may send a subscription cancelation message to the second network element. The subscription cancelation message may indicate second network element to stop feeding back data corresponding to the UE to the NWDAF 2. If the third network element does not receive the subscription cancellation message, the third network element may continue to feed back other input data to the NWDAF 2 based on an indication of the previous subscription message. Sequentially, the NWDAF 2 is enabled to obtain first input data that may not include the data corresponding to the UE. Alternatively, the NWDAF 2 may send a new subscription request message or a subscription modification message, where one or more users are implicitly added to a subscription blacklist.

When the NWDAF 2 determines that the UE is in a normal state and the confidence level is greater than the preset threshold, the NWDAF 2 may generate a corresponding analytics output based on the input data that includes the data corresponding to the UE.

Further, after generating the analytics output based on the input data that does not include the data corresponding to the UE in an abnormal state, the NWDAF 2 may send the analytics output to a network element that subscribes to the analytics output, and may feed back together an exception type, time information, and area information of the UE in an abnormal state to the network element, so that the network element performs, based on received information, a corresponding processing operation, for example, correcting an executed incorrect operation.

Further, when determining that the UE is in an abnormal state, the NWDAF 2 may alternatively send disable indication information or first indication information to a network element that subscribes to the analytics output. The disable indication information may indicate the network element to disable analytics output that is previously fed back by the NWDAF 2, cancel a related operation performed based on the analytics output that is previously fed back, refuse to continue to perform a corresponding operation based on the analytics output that is previously fed back, or the like. The first indication information may indicate the network element to reduce a confidence level of the analytics output that is previously fed back by the NWDAF 2, so that the network element determines, based on the analytics output whose confidence level is lowered, to perform a corresponding processing process. For example, when determining, based on the first indication information, that the confidence level of the analytics output that is previously fed back by the NWDAF 2 is lowered to 30%, the network element may cancel an operation previously performed based on the analytics output, or perform an operation opposite to the previous operation.

Figure 4:
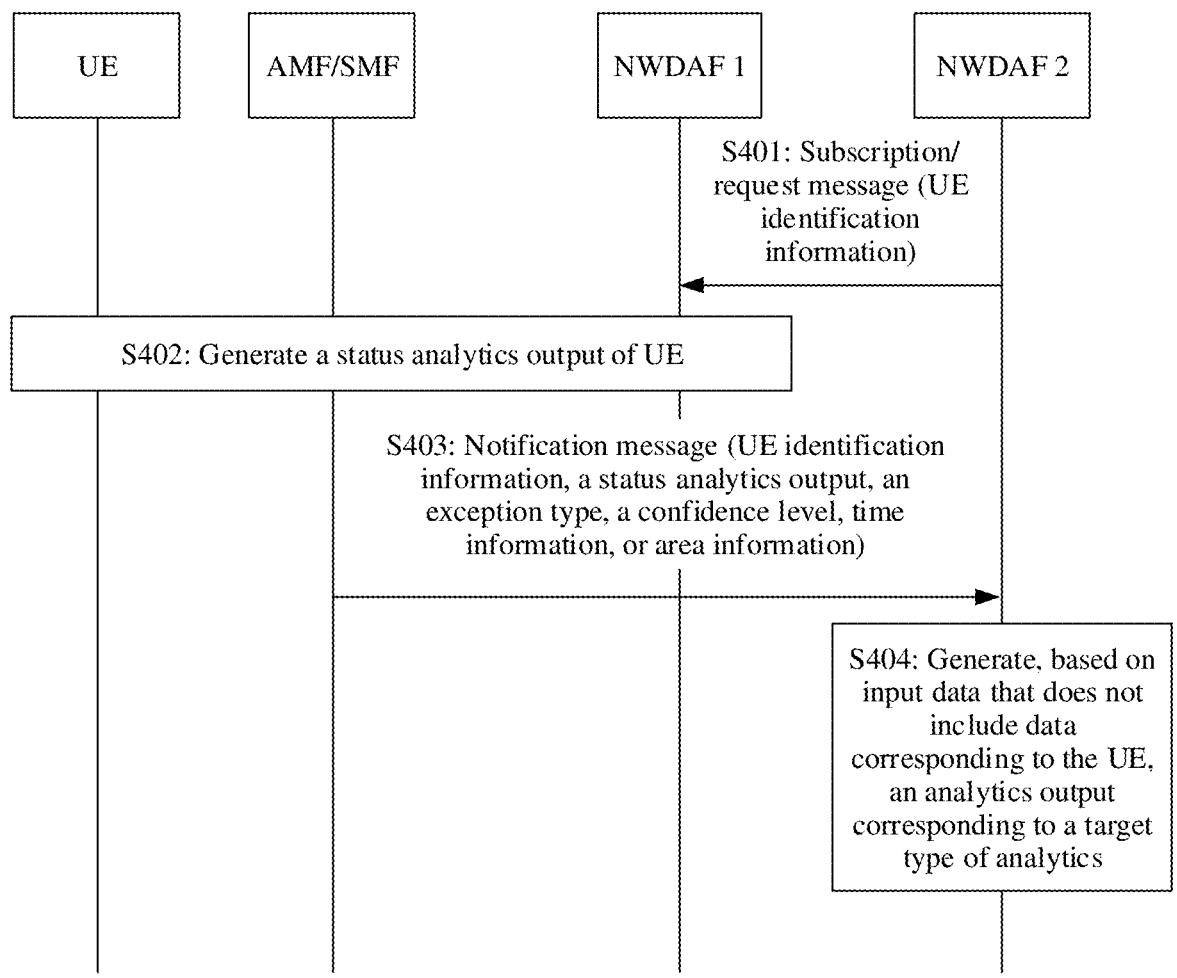
FIG. 4 is a schematic diagram of signaling exchange of another communication method with reference to a specific scenario according to an embodiment of this application.

In the foregoing scenario embodiments, the status analytics output monitored and generated by the NWDAF 1 is sent to the UDM/UDR for storage. In addition, when the NWDAF 2 needs the status analytics output of the UE, the NWDAF 2 may obtain the status analytics output from the UDM/UDR. However, in another possible embodiment, after generating the status analytics output corresponding to the UE, the NWDAF 1 may directly notify the NWDAF 2 of the status analytics output, and may not store the status analytics output in the UDM/UDR. Specifically, FIG. 4 is a schematic diagram of signaling exchange in still another scenario embodiment according to an embodiment of this application. The method may specifically include the following steps.

S401: An NWDAF 2 sends a subscription message or a request message for a status analytics output of UE to an NWDAF 1, where the subscription message or the request message is used to request the status analytics output of the UE.

In this embodiment, the NWDAF 2 may subscribe to or request the status analytics output of the UE from the NWDAF 1, so as to determine, based on the status analytics output fed back by the NWDAF 1, whether the UE is in an abnormal state.

In an example, the subscription message/request message may include UE identification information corresponding to a specific user or UE group identification information corresponding to a group. Alternatively, the subscription message/request message may include network identification information or area identifier information, so as to request status analytics outputs of one or more UEs located in a network corresponding to the network identification information, or request status analytics outputs of one or more UEs located in an area corresponding to the area identifier information.

S402: The NWDAF 1 generates the status analytics output of the UE.

A specific implementation of step S402 in this embodiment is similar to that of step S301. For details, refer to related description of step S301. Details are not described herein again.

S403: The NWDAF 1 sends a notification or response message to an NWDAF 2, where the notification or response message may include UE identification information, a status analytics output, an exception type, a confidence level, time information, or area information.

In this embodiment, after generating the status analytics output corresponding to the UE, the NWDAF 1 may directly notify another NWDAF (including the NWDAF 2) in a network of the status analytics output, and may not store the notification message in the UDM/UDR. The another NWDAF that receives the status analytics output may initiate a subscription or request for the analytics output of the UE to the NWDAF 1 in advance.

S404: When determining, based on the received status analytics output, that the UE is in an abnormal state and a confidence level is greater than a preset threshold, the NWDAF 2 generates, based on input data that does not include data corresponding to the UE, an analytics output corresponding to a target type of analytics.

Figure 5:
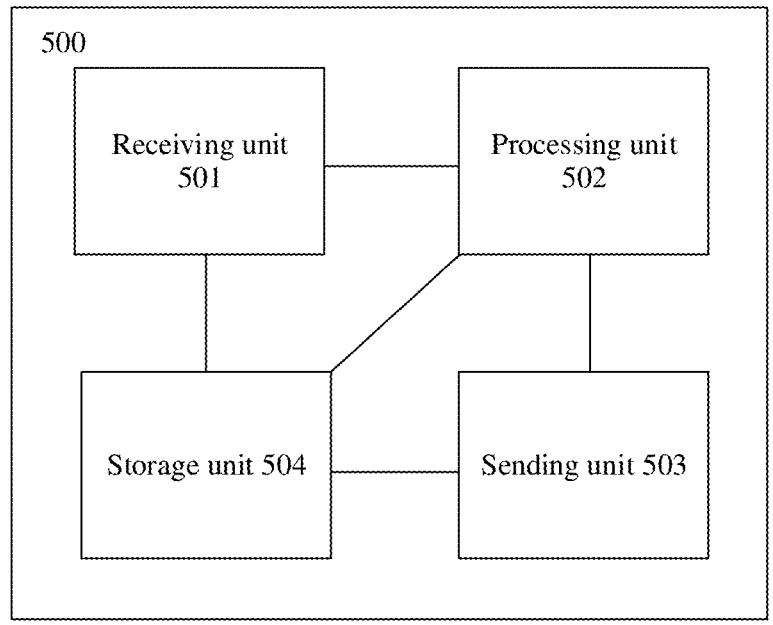
FIG. 5 is a schematic diagram of a structure of a communication apparatus according to an embodiment of this application.

In addition, an embodiment of this application further provides a communication apparatus. FIG. 5 is a schematic diagram of a structure of a communication apparatus according to an embodiment of this application. The apparatus 500 may be applied to a second data analytics network element, and may perform method steps performed by the second data analytics network element in the foregoing method embodiments. Specifically, the apparatus 500 may include a receiving unit 501 and a processing unit 502. The apparatus 500 may further include a sending unit 503 and a storage unit 504.

The receiving unit 501 is configured to receive a status analytics output of a target object from a first data analytics network element, where the target object includes one or more of a network device, a sub-domain of a network, an all-domain of a network, or a terminal device.

The processing unit 502 is configured to: obtain, based on the status analytics output of the target object, first input data corresponding to a target type of analytics, where when the status analytics output of the target object indicates that the target object is in an abnormal state, the first input data does not include data corresponding to the target object; and generate, based on the first input data, a first analytics output corresponding to the target type of analytics.

The storage unit 504 in the apparatus 500 may be configured to store corresponding data, for example, may store the status analytics output of the target object, the first input data, the first analytics output, or the like. Optionally, the storage unit 504 may further store data received by the receiving unit 501 and data obtained when the processing unit 502 performs corresponding processing in the following possible implementations, and the sending unit 503 may send some or all data in the storage unit 504.

In a possible implementation, the sending unit 503 is configured to send the first analytics output and/or first indication information to a first network element. The first indication information indicates the first network element to disable a second analytics output or lower a confidence level corresponding to the second analytics output to a first confidence level. The second analytics output is an analytics output that is of the target type of analytics and that is generated by the second data analytics network element based on second input data and sent to the first network element. The second input data includes data corresponding to the target object.

In a possible implementation, the sending unit 503 is specifically configured to: when the second data analytics network element determines that the first analytics output is different from the second analytics output, send, by the second data analytics network element, the first analytics output to the first network element.

In a possible implementation, the receiving unit 501 is further configured to receive first time information and/or first area information corresponding to the status analytics output of the target object.

That the first input data does not include the data corresponding to the target object includes:

The first input data does not include the data that is of the target object and that corresponds to the first time information and/or the first area information.

In a possible implementation, the sending unit 503 is further configured to send second time information and/or second area information corresponding to the first indication information to the first network element.

In a possible implementation, the sending unit 503 is further configured to send third time information and/or third area information applicable to the first analytics output to the first network element.

In a possible implementation, the sending unit 503 is further configured to send a first exception reason to the first network element, where the first exception reason indicates a reason why the first analytics output and/or the first indication information are/is sent.

In a possible implementation, the processing unit 502 is specifically configured to: delete the data corresponding to the target object in third input data that is obtained and that corresponds to the target type of analytics, to obtain the first input data; or unsubscribe the data corresponding to the target object from the second network element, and receive the first input data from a third network element.

In a possible implementation, the status analytics output of the target object includes a status prediction analytics output of the target object.

In a possible implementation, the receiving unit 501 is further configured to receive a second confidence level corresponding to the status analytics output of the target object from the first data analytics network element.

The processing unit 502 is specifically configured to: when the second data analytics network element determines that the second confidence level is greater than a first threshold, and determines, based on the status analytics output of the target object, that the target object is in the abnormal state, obtain, by the second data analytics network element, based on the status analytics output of the target object, the first input data corresponding to the target type of analytics.

In a possible implementation, the sending unit 503 is further configured to send a third confidence level corresponding to the first analytics output to the first network element, where the third confidence level is determined by the second data analytics network element based on the first input data and the second confidence level.

In a possible implementation, the receiving unit 501 is specifically configured to obtain the status analytics output of the target object from a fourth network element, where the status analytics output of the target object is sent by the first data analytics network element to the fourth network element.

In a possible implementation, the status analytics output of the target object includes status indication information, where the status indication information indicates that the target object is in any one of the following statuses: a normal state, an abnormal state, or an unknown state.

In a possible implementation, the status analytics output of the target object includes any one or more of the following information: an exception type, an exception subtype, a second exception reason, an exception level, or an exception trend.

Content such as information exchange or an execution process between the modules of the foregoing apparatuses is based on a same concept as method embodiments in embodiments of this application. Therefore, technical effects brought by the content are the same as those brought by method embodiments in embodiments of this application. For ease and brevity of description, for specific working processes of the foregoing apparatuses and modules, refer to corresponding processes in the foregoing method embodiments. Details are not described herein again.

Figure 6:
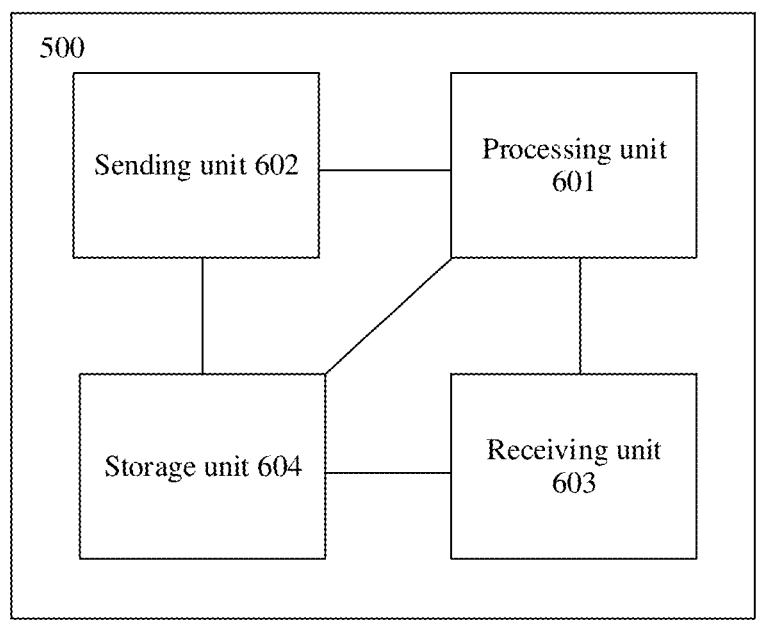
FIG. 6 is a schematic diagram of a structure of another communication apparatus according to an embodiment of this application.

In addition, an embodiment of this application further provides a communication apparatus. FIG. 6 is a schematic diagram of a structure of a communication apparatus according to an embodiment of this application. The apparatus 600 may be applied to a first data analytics network element, and may perform method steps performed by the first data analytics network element in the foregoing method embodiments. Specifically, the apparatus 600 may include a processing unit 601 and a sending unit 602. The apparatus 600 may further include a receiving unit 603 and a storage unit 604.

The processing unit 601 is configured to receive a status analytics output of a target object, where the target object includes one or more of a network device, a sub-domain of a network, an all-domain of a network, or a terminal device.

The sending unit 602 is configured to send the status analytics output of the target object.

The storage unit 604 in the apparatus 600 may be configured to store corresponding data, for example, may store the status analytics output of the target object or the like.

Optionally, the storage unit 604 may further store data received by the receiving unit 603 and data obtained when the processing unit 601 performs corresponding processing in the following possible implementations, and the sending unit 602 may send some or all data in the storage unit 604.

In a possible implementation, the sending unit 602 is further configured to send, to a second data analytics network element, first time information and/or first area information corresponding to the status analytics output of the target object.

In a possible implementation, the status analytics output of the target object includes an analytics output of a historical status of the target object or an analytics output of a future status of the target object.

In a possible implementation, the sending unit 602 is further configured to send a second confidence level corresponding to the status analytics output of the target object to the second data analytics network element.

In a possible implementation, the receiving unit 603 is configured to receive second indication information from the second data analytics network element.

The sending unit 602 is specifically configured to: when it is determined, based on the second indication information, that the target object is in an abnormal state, send the status analytics output of the target object to a data analytics network element.

In a possible implementation, the processing unit 601 is specifically configured to respond to a first request message from the second data analytics network element received by using the receiving unit, and generate the status analytics output of the target object, where the first request message is configured to request the status analytics output of the target object from the first data analytics network element.

In a possible implementation, the status analytics output of the target object includes status indication information, where the status indication information indicates that the target object is in any one of the following statuses: a normal state, an abnormal state, or an unknown state.

In a possible implementation, the status analytics output of the target object includes any one or more of the following information: an exception type, an exception subtype, a second exception reason, an exception level, or an exception trend.

In a possible implementation, the target object includes a target object of a target network slice.

In a possible implementation, the network slice includes a slice instance or a slice sub-instance.

In a possible implementation, a sub-domain of a network may include one or more of an access network domain, a core network domain, or a transport network domain.

Content such as information exchange or an execution process between the modules of the foregoing apparatuses is based on a same concept as method embodiments in embodiments of this application. Therefore, technical effects brought by the content are the same as those brought by method embodiments in embodiments of this application. For ease and brevity of description, for specific working processes of the foregoing apparatuses and modules, refer to corresponding processes in the foregoing method embodiments. Details are not described herein again.

In the apparatuses shown in FIG. 5 and FIG. 6, the processing unit, the receiving unit, the sending unit, and the storage unit may be physically separated units, or may be integrated into one or more physical units. This is not limited herein.

The receiving unit and the sending unit are configured to implement content exchange between the apparatus and another unit or network element. The sending unit may be a sending circuit or a transmitter. The receiving unit may be a receiving circuit or a receiver. Alternatively, the sending unit and the receiving unit may be communication units of the communication apparatus. Alternatively, the sending unit and the receiving unit may be communication interfaces or transceiver circuits of the processing unit. Optionally, the sending unit and the receiving unit may be a transceiver chip. Alternatively, the communication apparatus may include a plurality of sending units and a plurality of receiving units. Alternatively, the sending unit and the receiving unit may be subunits of one or more transceiver units.

The processing unit is configured to implement data processing by the communication apparatus. The processing unit may be a processing circuit, or may be a processor. Alternatively, the communication apparatus may include a plurality of processing units, or the processing unit includes a plurality of data processing subunits. Specifically, the processor may be a single-core (single-CPU) processor, or may be a multi-core (multi-CPU) processor.

The storage unit may be a unit independent of the processing unit, or may be a storage unit in the processing unit. This is not limited herein. Alternatively, the communication apparatus may include a plurality of storage units, or the storage unit includes a plurality of storage subunits.

In addition, an embodiment of this application further provides a communication apparatus. The communication apparatus may be applied to the first data analytics network element or the second data analytics network element mentioned in the foregoing method embodiments. The communication apparatus may include a processor and a memory, and the processor is coupled to the memory.

The memory is configured to store a computer program or instructions.

The processor is configured to execute the computer program or instructions, so that the communication methods performed by the first data analytics network element in the foregoing method embodiments are performed, or the communication methods performed by the second data analytics network element in the foregoing method embodiments are performed.

In some possible implementations, the processor executes the computer program or the instructions, so that the communication methods performed by a core network element in the foregoing method embodiments may also be performed.

Figure 7:
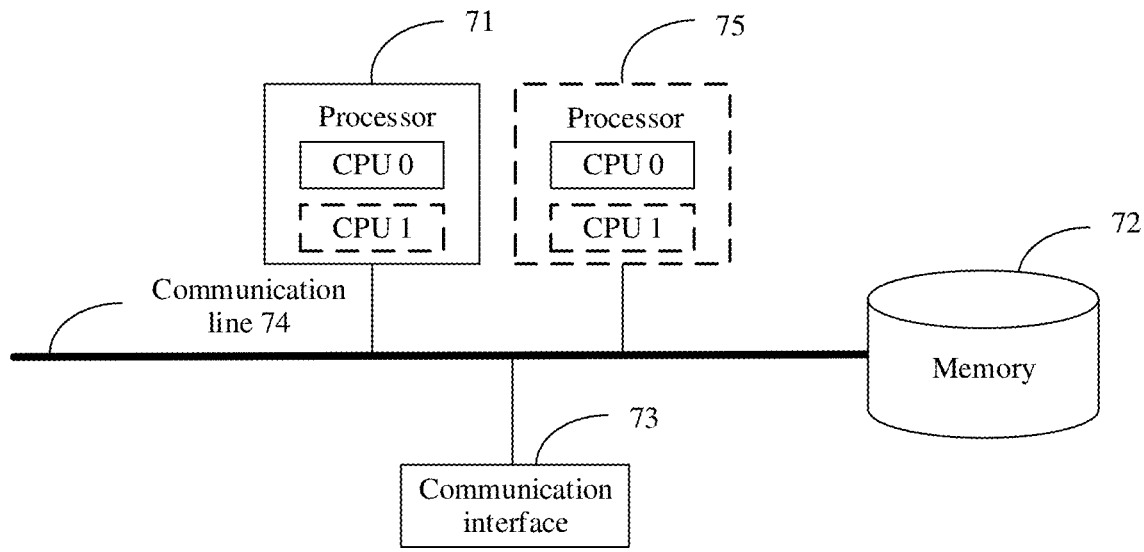
FIG. 7 is a schematic diagram of a hardware structure of a communication apparatus according to an embodiment of this application.

FIG. 7 is a schematic diagram of a hardware structure of a communication apparatus, where the communication apparatus may be a first network element or data analytics network element in embodiments of this application. The communication apparatus includes at least one processor 71 (where as shown in FIG. 7, the processor 75 or the like may be further included), at least one memory 72, and at least one communication interface 73. The processor 71, the memory 72 and the communication interface 73 connect to each other, for example, by using a communication line 74. In this embodiment of this application, the processor 71 may include one CPU. For example, the processor 71 shown in FIG. 7 may include only a CPU 0. Alternatively, the processor 71 may include a plurality of CPUs. For example, the processor 71 shown in FIG. 7 may further include a CPU 0, a CPU 1, or the like. Certainly, the processor 71 may further include at least three (including three) CPUs. Optionally, the communication apparatus further includes another processor. As shown in FIG. 7, the communication apparatus may further include a processor 75, and the another processor may also include one or more CPUs. Connections may include various types of interfaces, transmission lines, buses, or the like. This is not limited in this embodiment. The communication interface 73 is configured to enable the communication apparatus to connect to another communication device via a communication link. For example, the communication interface 73 may be an S1 interface, or an X2 or Xn interface.

The processor 71 shown in FIG. 7 may specifically complete a processing action of the data analytics network element or the first network element in the foregoing methods. The memory 72 may complete a storing action in the foregoing methods. The communication interface 73 may complete an exchange action of the communication apparatus with another network element in the foregoing methods. An example in which the communication apparatus shown in FIG. 7 is applied to the data analytics network element is used for description in the following.

The processor 71 may obtain, based on a status analytics output of a target object, first input data corresponding to a target type of analytics, and generate, based on the first input data, a first analytics output corresponding to the target type of analytics. The memory 72 may store the status analytics output of the target object, the first input data, the first analytics output, or the like. For specific content in the status analytics output of the target object, the first input data, or the first analytics output, refer to related description in another embodiment.

The processor in this embodiment of this application, for example, the processor 71, may include but is not limited to at least one of the following: a central processing unit (CPU), a microprocessor, a digital signal processor (DSP), a microcontroller unit (MCU), an artificial intelligence processor, or various computing devices that run software. Each computing device may include one or more cores configured to execute software instructions to perform an operation or processing. The processor may be an independent semiconductor chip, or may be integrated with another circuit to form a semiconductor chip. For example, a SoC (system-on-a-chip) may include the processor and another circuit (for example, a codec circuit, a hardware acceleration circuit, or various buses and interface circuits). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed to a computer. However, the memory is not limited thereto.

The memory 72 may exist independently, and is connected to the processor 71 (and the processor 75). Optionally, the memory 72 may be integrated with the processor 71 (and the processor 75), for example, integrated into a chip.

The memory 72 can store program code for executing the technical solutions in embodiments of this application, and the processor 71 controls execution of the program code. Various types of executed computer program code may also be considered as drivers of the processor 71. For example, the processor 71 is configured to execute computer program code stored in the memory 72, to implement the technical solutions in embodiments of this application.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive solid-state drive, SSD), or the like.

Figure 8:
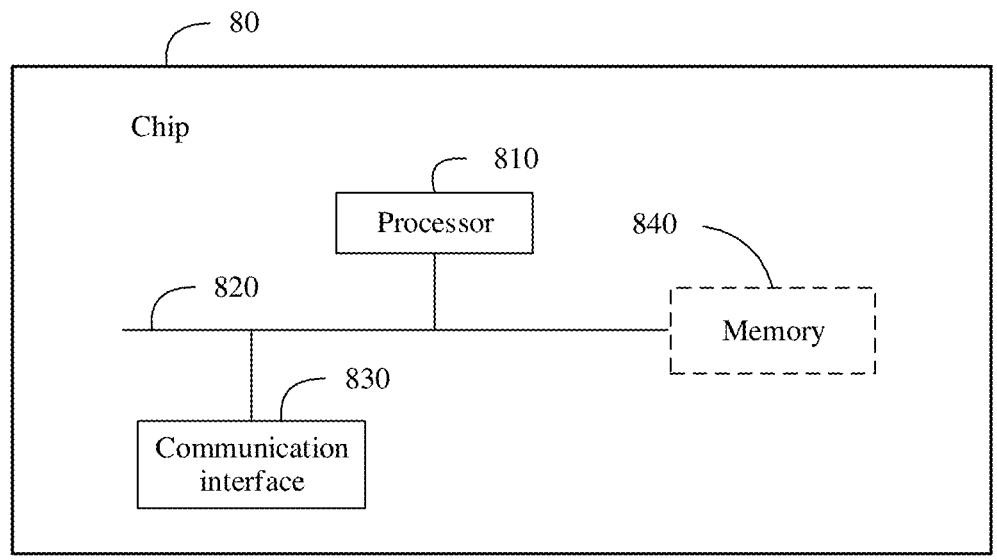
FIG. 8 is a schematic diagram of a hardware structure of a chip according to an embodiment of this application.

FIG. 8 is a schematic diagram of a hardware structure of a chip 80 according to an embodiment of this application. The chip 80 includes one or more (including two) processors 810 and a communication interface 830. The processor 810 may be coupled to the communication interface 830. In this embodiment of this application, connections may include various types of interfaces, transmission lines, buses, or the like. This is not limited in this embodiment. The communication interface 830 is configured to enable the chip 80 to connect to another communication device via a communication link.

Optionally, the chip 80 further includes a memory 840. The memory 840 may be connected to the processor 810 and the communication interface 830, for example, via a communication line 820. The memory 840 may include a read-only memory and a random access memory, and provide operation instructions and data to the processor 810. A part of the memory 840 may further include a non-volatile random access memory (NVRAM).

In some implementations, the memory 840 stores the following element: an execution module or a data structure, a subset of the execution module or the data structure, or an extended set of the execution module or the data structure.

In embodiments of this application, the operation instructions (where the operation instructions may be stored in an operating system) stored in the memory 840 are invoked to perform corresponding operations.

The processor 810 shown in FIG. 8 may specifically complete a processing action of the data analytics network element or the first network element in the foregoing methods. The memory 840 may complete a storing action in the foregoing methods. The communication interface 830 may complete an exchange action with another network element (or a module in another network element) in the foregoing methods. An example in which the chip shown in FIG. 8 is applied to the data analytics network element is used for description in the following.

The processor 810 may obtain, based on a status analytics output of a target object, first input data corresponding to a target type of analytics, and generate, based on the first input data, a first analytics output corresponding to the target type of analytics. The memory 840 may store the status analytics output of the target object, the first input data, the first analytics output, or the like. For specific content in the status analytics output of the target object, the first input data, or the first analytics output, refer to related description in another embodiment.

An embodiment of this application further provides a computer-readable storage medium. The methods described in the foregoing embodiments may be all or partially implemented by software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communications medium, and may further include any medium that can transfer a computer program from one place to another. The storage medium may be any target medium that can be accessed to a computer.

In an optional design, the computer-readable medium may include a RAM, a ROM, an EEPROM, a CD-ROM or another optical disc storage, a magnetic disk storage or another magnetic storage device, or any other medium that is used to carry or store required program code in a form of instructions or a data structure and that is accessible by the computer. In addition, any connection is appropriately referred to as a computer-readable medium. For example, if a coaxial cable, an optical fiber cable, a twisted pair, a digital subscriber line (DSL), or wireless technology (such as infrared, radio, or microwave) is used to transmit software from a website, a server, or another remote source, the coaxial cable, the optical fiber cable, the twisted pair, the DSL, or the wireless technology such as infrared, radio, or microwave is included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by software, hardware, firmware, or any combination thereof. If the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a base station, a terminal, or another programmable apparatus.

It should be noted that in this application, "of (English: of)", "corresponding (English: corresponding, relevant)", and "corresponding (English: corresponding)" may be interchangeably used sometimes. It should be noted that expressed meanings are consistent when differences are not emphasized.

It should be noted that, in embodiments of this application, the word "exemplary" or "for example" is used to represent giving an example, an illustration, or description. Any embodiment or design scheme described as an "example" or "for example" in embodiments of this application should not be explained as being more preferred or having more advantages than another embodiment or design scheme. Exactly, use of the word "exemplary" or "example" or the like is intended to present a relative concept in a specific manner.

In this application, "at least one" refers to one or more. "Multiple" refers to two or more than two. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The system architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The invention claimed is:

1. A communication method, comprising:
   receiving, by a second data analytics network element, a status analytics output of a target object from a first data analytics network element, wherein the target object comprises one or more of a network device, a sub-domain of a network, an all-domain of a network, or a terminal device;
   obtaining, by the second data analytics network element based on the status analytics output of the target object, first input data corresponding to a target type of analytics, wherein the status analytics output of the target object indicates that the target object is in an abnormal state, indicating that the first input data does not comprise data corresponding to the target object; and
   generating, by the second data analytics network element based on the first input data, a first analytics output corresponding to the target type of analytics.

2. The communication method according to claim 1, further comprising:
   obtaining, by the second data analytics network element, at least one of first time information or first area information corresponding to the status analytics output of the target object,
   wherein when the first input data does not comprise data corresponding to the target object, the first input data does not comprise data that is of the target object and the first input data does not comprise data that corresponds to at least one of the first time information or the first area information.

3. The communication method according to claim 2, further comprising:
   sending, by the second data analytics network element, at least one of the first analytics output or first indication information to a first network element,
   wherein
   the first indication information indicates the first network element to disable a second analytics output or lower a confidence level corresponding to the second analytics output to a first confidence level,
   the second analytics output is an analytics output that is of the target type of analytics and that is generated by the second data analytics network element based on second input data and sent to the first network element, and
   the second input data comprises data corresponding to the target object.

4. The communication method according to claim 3, wherein the sending, by the second data analytics network element, the first analytics output to the first network element comprises:
   in response to the second data analytics network element determining that the first analytics output is different from the second analytics output, sending, by the second data analytics network element, the first analytics output to the first network element.

5. The communication method according to claim 3, further comprising:
   sending, by the second data analytics network element, at least one of second time information or second area information corresponding to the first indication information to the first network element.

6. The communication method according to claim 3, further comprising:
   sending, by the second data analytics network element, at least one of third time information or third area information applicable to the first analytics output to the first network element.

7. The communication method according to claim 3, further comprising:
   sending, by the second data analytics network element, a first exception reason to the first network element, wherein the first exception reason indicates at least one of a reason why the first analytics output or the first indication information is sent.

8. The communication method according to claim 3, further comprising:
   obtaining, by the second data analytics network element, a second confidence level corresponding to the status analytics output of the target object from the first data analytics network element,
   wherein
   the obtaining, by the second data analytics network element based on the status analytics output of the target object, first input data corresponding to the target type of analytics comprises:

in response to the second data analytics network element determining that the second confidence level is greater than a first threshold, and determining, based on the status analytics output of the target object, that the target object is in the abnormal state, obtaining, by the second data analytics network element based on the status analytics output of the target object, the first input data corresponding to the target type of analytics.

9. The communication method according to claim 8, further comprising:
sending, by the second data analytics network element, a third confidence level corresponding to the first analytics output to the first network element, wherein the third confidence level is determined by the second data analytics network element based on the first input data and the second confidence level.

10. The communication method according to claim 1, wherein the obtaining, by the second data analytics network element based on the status analytics output of the target object, first input data corresponding to the target type of analytics comprises:
deleting, by the second data analytics network element, the data corresponding to the target object in third input data that is obtained and that corresponds to the target type of analytics, to obtain the first input data; or
unsubscribing, by the second data analytics network element, the data corresponding to the target object from a second network element, and receiving, by the second data analytics network element, the first input data from a third network element.

11. The communication method according to claim 1, wherein the status analytics output of the target object comprises a status prediction analytics output of the target object.

12. The communication method according to claim 1, wherein the receiving, by the second data analytics network element, the status analytics output of the target object from the first data analytics network element comprises:
obtaining, by the second data analytics network element, the status analytics output of the target object from a fourth network element, wherein the status analytics output of the target object is sent by the first data analytics network element to the fourth network element.

13. The communication method according to claim 1, wherein
the status analytics output of the target object comprises status indication information, and
the status indication information indicates that the target object is in a normal state, an abnormal state, or an unknown state.

14. The communication method according to claim 1, wherein the status analytics output of the target object comprises one or more of an exception type, an exception subtype, a second exception reason, an exception level, or an exception trend.

15. A communication apparatus comprising:
a memory configured to store instructions; and
a processor coupled to the memory and configured to execute the instructions to cause the communication apparatus to:
receive a status analytics output of a target object from a first data analytics network element, wherein the target object comprises one or more of a network device, a sub-domain of a network, an all-domain of a network, or a terminal device;

obtain, based on the status analytics output of the target object, first input data corresponding to a target type of analytics, wherein the status analytics output of the target object indicates that the target object is in an abnormal state, indicating that the first input data does not comprise data corresponding to the target object; and
generate, based on the first input data, a first analytics output corresponding to the target type of analytics.

16. The communication apparatus according to claim 15, wherein the communication apparatus is further caused to:
obtain at least one of first time information or first area information corresponding to the status analytics output of the target object,
wherein when the first input data does not comprise data corresponding to the target object, the first input data does not comprise data that is of the target object and the first input data does not comprise data that corresponds to at least one of the first time information or the first area information.

17. The communication apparatus according to claim 16, wherein the communication apparatus is further caused to:
send at least one of the first analytics output or first indication information to a first network element,
wherein
the first indication information indicates the first network element to disable a second analytics output or lower a confidence level corresponding to the second analytics output to a first confidence level,
the second analytics output is an analytics output that is of the target type of analytics and that is generated based on second input data and sent to the first network element, and
the second input data comprises data corresponding to the target object.

18. The communication apparatus according to claim 15, wherein the status analytics output of the target object comprises a status prediction analytics output of the target object.

19. The communication apparatus according to claim 15, wherein the status analytics output of the target object comprises one or more of an exception type, an exception subtype, a second exception reason, an exception level, or an exception trend.

20. A communication system, comprising:
a first data analytics network element; and
a second data analytics network element,
wherein
the second data analytics network element is configured to:
receive a status analytics output of a target object from the first data analytics network element, wherein the target object comprises one or more of a network device, a sub-domain of a network, an all-domain of a network, or a terminal device;
obtain, based on the status analytics output of the target object, first input data corresponding to a target type of analytics, wherein the status analytics output of the target object indicates that the target object is in an abnormal state, indicating that the first input data does not comprise data corresponding to the target object; and
generate, based on the first input data, a first analytics output corresponding to the target type of analytics, and the first data analytics network element is configured to:
communicate with the second data analytics network element; and
send the status analytics output of the target object to the second data analytics network element.

* * * * *